(12) United States Patent
Zhang et al.

(10) Patent No.: US 12,395,611 B2
(45) Date of Patent: Aug. 19, 2025

(54) ELECTRONIC DEVICE, METHOD FOR DATA TRANSMISSION BETWEEN THE ELECTRONIC DEVICE AND ANOTHER ELECTRONIC DEVICE, AND MEDIUM

(71) Applicant: HUAWEI TECHNOLOGIES CO., LTD., Guangdong (CN)

(72) Inventors: Xinying Zhang, Shenzhen (CN); Guang Ren, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 18/274,598

(22) PCT Filed: Dec. 31, 2021

(86) PCT No.: PCT/CN2021/143621
§ 371 (c)(1),
(2) Date: Jul. 27, 2023

(87) PCT Pub. No.: WO2022/161106
PCT Pub. Date: Aug. 4, 2022

(65) Prior Publication Data
US 2024/0089414 A1    Mar. 14, 2024

(30) Foreign Application Priority Data
Jan. 29, 2021    (CN) .................. 202110129420.X

(51) Int. Cl.
*H04N 7/18*    (2006.01)
*H04N 7/14*    (2006.01)

(52) U.S. Cl.
CPC ............ *H04N 7/183* (2013.01); *H04N 7/147* (2013.01)

(58) Field of Classification Search
CPC .............................. H04N 7/183; H04N 7/147
See application file for complete search history.

(56) References Cited

U.S. PATENT DOCUMENTS

| | | | |
|---|---|---|---|
| 10,834,358 B1 * | 11/2020 | Harrison | H04N 5/2628 |
| 2016/0149722 A1 * | 5/2016 | Yamanishi | H04W 60/04 |
| | | | 348/143 |
| 2016/0232114 A1 * | 8/2016 | Lo | G06F 9/4411 |

FOREIGN PATENT DOCUMENTS

| | | |
|---|---|---|
| CN | 105867997 A | 8/2016 |
| CN | 105930180 A | 9/2016 |
| CN | 107959845 A | 4/2018 |
| CN | 111625214 A | 9/2020 |
| WO | 2020107040 A2 | 5/2020 |

* cited by examiner

*Primary Examiner* — Amal S Zenati
(74) *Attorney, Agent, or Firm* — WOMBLE BOND DICKINSON (US) LLP

(57) ABSTRACT

A method includes: A first application on the first electronic device invokes a first function; the first electronic device determines to implement the first function by using the second electronic device; the first electronic device, implements data transmission with the second electronic device by using a first function transceiver module of the first electronic device; and a first function processing module of the first electronic device processes data generated during implementation of the first function, where the first function transceiver module and the first function processing module are disposed at a hardware abstraction layer of the first electronic device.

20 Claims, 34 Drawing Sheets

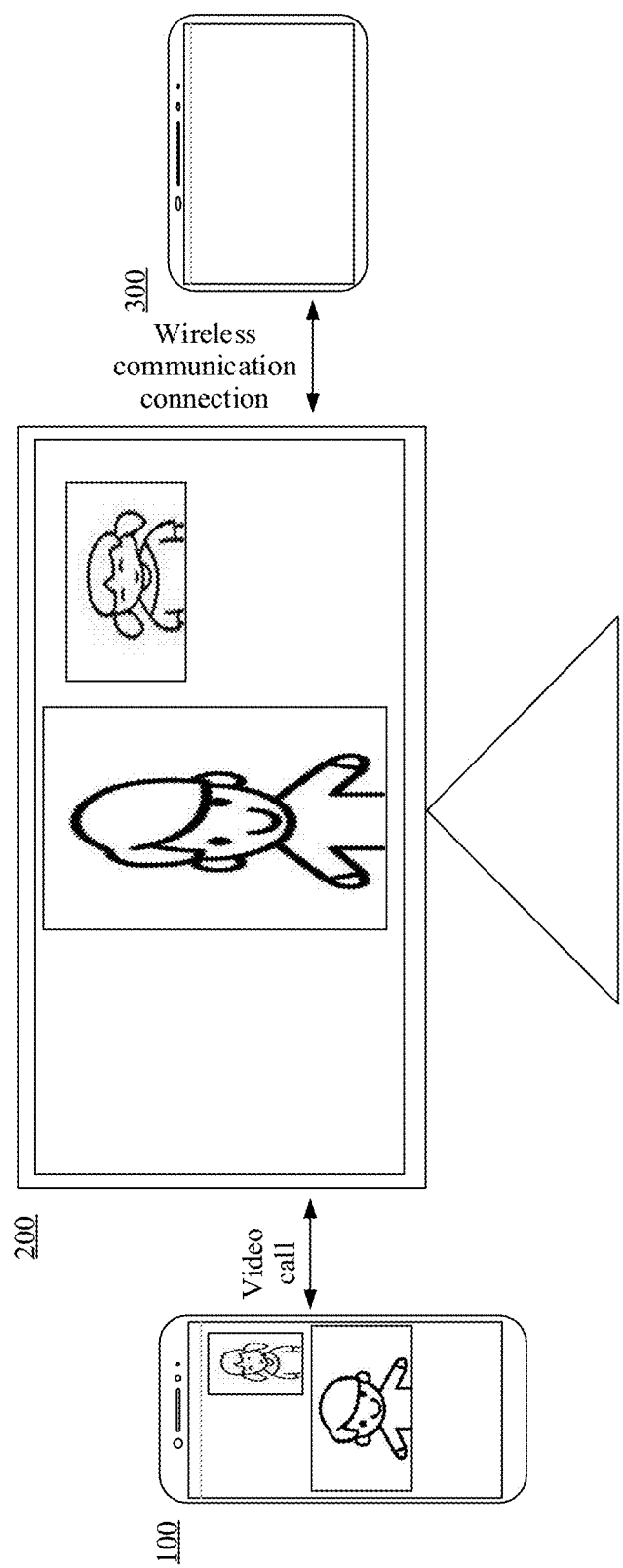

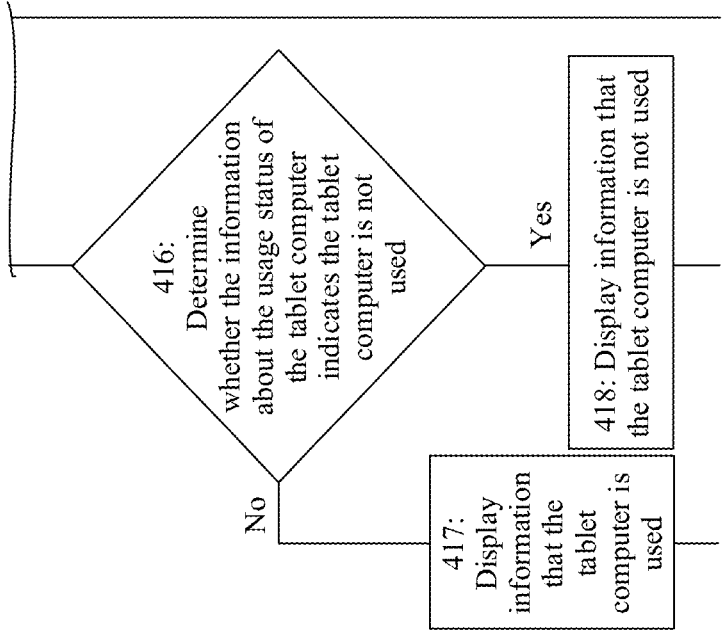

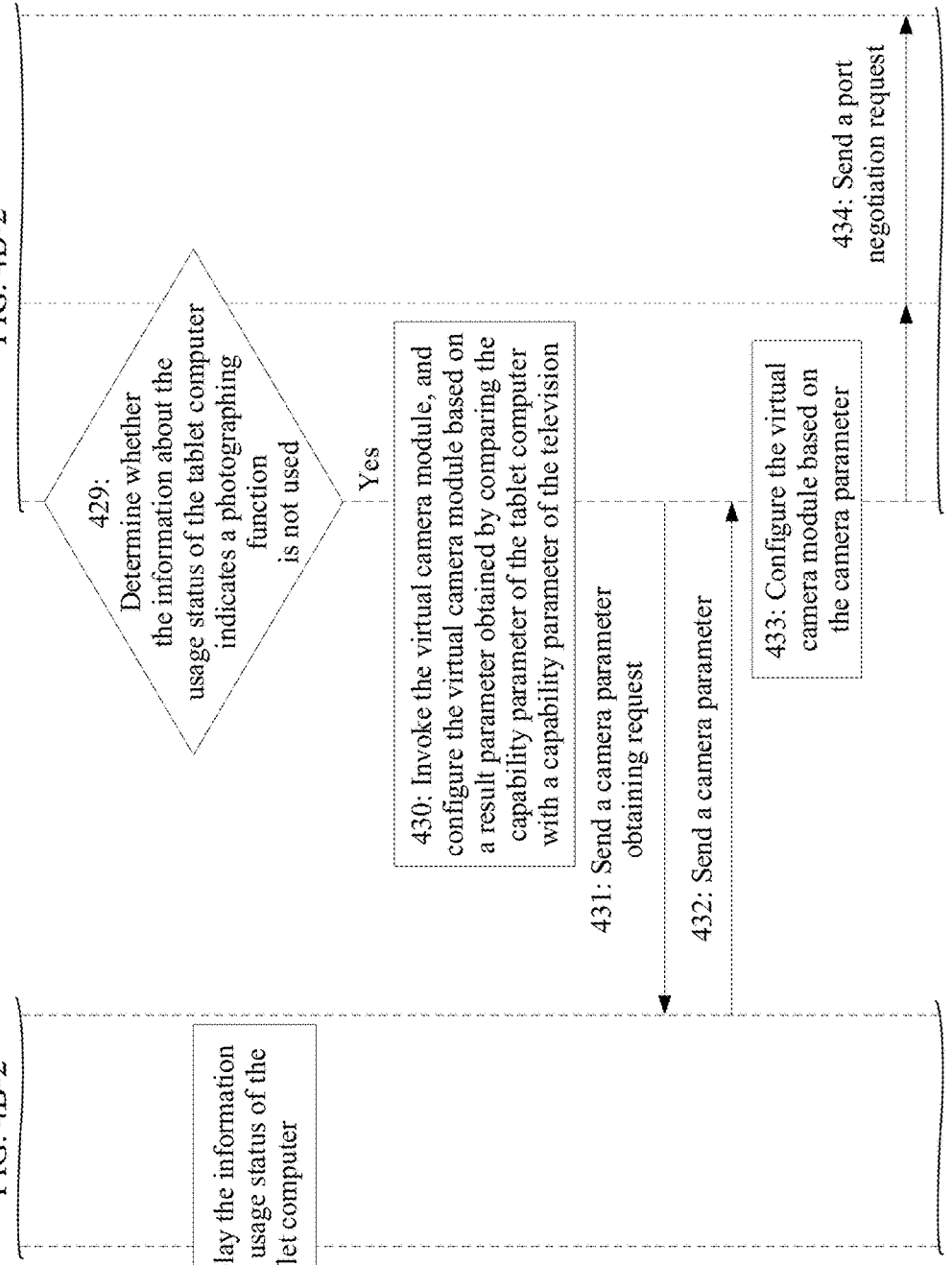

ELECTRONIC DEVICE, METHOD FOR DATA TRANSMISSION BETWEEN THE ELECTRONIC DEVICE AND ANOTHER ELECTRONIC DEVICE, AND MEDIUM

This application is a National Stage of International Application No. PCT/CN2021/143621, filed on Dec. 31, 2021, which claims priority to Chinese Patent Application No. 202110129420.X, filed on Jan. 29, 2021, all of which are hereby incorporated by reference in their entireties.

TECHNICAL FIELD

This application relates to the field of wireless communications technologies, and in particular, to an electronic device, a method for data transmission between the electronic device and another electronic device, and a medium.

BACKGROUND

At present, the distributed device virtualization kit (DV Kit for short) has been applied in a plurality of scenarios. For example, a mobile phone may obtain video data in a larger range by using a remote external photographing device (for example, an unmanned aerial vehicle), to give full play to an advantage of hardware of another peripheral device.

FIG. 1 shows two manners in which a mobile phone 100 obtains video data of an electronic device 300 that has a camera. In one of the manners, the video data is transmitted through wireless communication, and the external electronic device 300 that has the camera directly transmits the video data to the mobile phone 100 by using an application associated with the electronic device 300 that has the camera. However, if the application associated with the camera is not installed on the mobile phone 100, a photographing function of the electronic device 300 that has the camera cannot be used. Therefore, this manner lacks universality.

The other manner is to transmit the data through a cloud platform. Specifically, the electronic device 300 that has the camera uploads the video data to a cloud platform 400, and the mobile phone 100 reads the data from the cloud platform 400. There is a problem that an end-to-end (for example, the remote electronic device 300 that has the camera transmits the video data to the cloud platform 400 and then to the mobile phone 100) data transmission process is long with a long delay.

SUMMARY

Embodiments of this application provide an electronic device, a method for data transmission between the electronic device and another electronic device, and a medium.

According to a first aspect, an embodiment of this application provides a data transmission method. The method includes:
a first electronic device and a second electronic device establish a wireless communication connection;
a first application on the first electronic device invokes a first function;
the first electronic device determines to implement the first function by using the second electronic device;
the first electronic device implements data transmission with the second electronic device by using a first function transceiver module of the first electronic device; and
a first function processing module of the first electronic device processes data generated during implementation of the first function.

The first function transceiver module and the first function processing module are disposed at a hardware abstraction layer of the first electronic device.

In this embodiment of this application, if the first function is a photographing function, the first function processing module may be a virtual camera module. If the first function is an audio acquisition function, the first function processing module may be a virtual audio module, and the audio acquisition function may also be referred to as a sound pickup function. If the first function is an audio play function, the first function processing module may be a virtual sound module, and the audio play function may also be referred to as a sound play function or a loudspeaking function.

For example, the first electronic device is a television, the second electronic device is a tablet computer, and the first function that is preset is the photographing function. In a scenario in which a large-screen device, for example, a television is used for video calling, some large-screen devices have no camera. In this case, a camera of another device needs to be used to extend a photographing capability of the television, to give full play to an advantage of hardware of the another device. For example, in this application scenario, it is assumed that the television has no camera, or another device with better photographing performance needs to be used in distributed application to implement the photographing function. For example, when a user using the television needs to have a video call with a user using the tablet computer that has the photographing function, the television needs to complete the video call by using the tablet computer that has the photographing function. During the video call, video data captured by the tablet computer is transmitted to the television, through a wireless connection, for display.

In this embodiment of this application, it is set that a non-application layer (for example, a framework layer or the HAL layer) of the first electronic device receives and processes data sent by the second electronic device, and the data is directly transmitted by the second electronic device to the first electronic device, so that a data transmission path between the electronic devices is shortened, and a delay is reduced. In this way, a data transmission speed is improved. In addition, as the first electronic device receives, at the non-application layer, the video data sent by the second electronic device, an associated application does not need to be installed on both the first electronic device and the second electronic device. In this way, universality of data transmission between the devices is improved.

In an embodiment, the first function is the photographing function, and that the first electronic device implements data transmission with the second electronic device by using a first function transceiver module of the first electronic device includes:
receiving, by the first function transceiver module of the first electronic device from the second electronic device, image data and/or video data captured by the second electronic device, and sending the received image data and/or video data to the first function processing module.

In an embodiment, the first function is the audio acquisition function, and that the first electronic device implements data transmission with the second electronic device by using a first function transceiver module of the first electronic device includes:

The first function transceiver module of the first electronic device receives, from the second electronic device, audio data acquired by the second electronic device, and sends the received audio to the first function processing module.

In an embodiment, the method further includes: The first function is the loudspeaking function; and that the first electronic device implements data transmission with the second electronic device by using a first function transceiver module of the first electronic device includes:

The first function processing module of the first electronic device processes audio data that needs to be converted into sound by the second electronic device, and sends the processed audio data to the second electronic device by using the first function transceiver module.

In an embodiment, the method further includes: A second application on the first electronic device invokes the first function; and the first electronic device determines to implement the first function by using a first functional component of the first electronic device.

For example, the first electronic device is a television, the second electronic device is a tablet computer, the first function that is preset is the photographing function, the first application is a video calling application, and the second application is a photographing application. In a scenario in which a large-screen device, for example, a television is used for video calling, some large-screen devices have no camera. In this case, a camera of another device needs to be used to extend a photographing capability of the television, to give full play to an advantage of hardware of the another device. For example, in this application scenario, it is assumed that the television has no camera, or another device with better photographing performance needs to be used in distributed application to implement the photographing function. For example, when a user using the television needs to have a video call, by using the video calling application, with a user using the tablet computer that has the photographing function, the television needs to complete the video call by using the tablet computer that has the photographing function. During the video call, video data captured by the tablet computer is transmitted to the television, through a wireless connection, for display. In addition, if a camera is disposed in the television, or a camera may be connected in a wired manner, in a process in which the television completes the video call by using the tablet computer that has the photographing function, the user may further perform photographing functions such as video recording and photographing by using the photographing application on the television.

In an embodiment, the method further includes: The first electronic device transmits, to the second application by using a second function transceiver module of the first electronic device, data generated when the first functional component implements the first function; and the data generated when the first functional component implements the first function is processed by using a second function processing module of the first electronic device.

In this embodiment of this application, if the first function is the photographing function, the second function processing module may be a front-facing/rear-facing camera driver module, and the first functional component may be a front-facing/rear-facing camera. If the first function is the audio acquisition function, the second function processing module may be a microphone driver module, and the first functional component may be a microphone. If the first function is the audio play function, the second function processing module may be a loudspeaker driver module, and the first functional component may be a loudspeaker.

In an embodiment, the method further includes: The first application on the first electronic device further invokes a second function;

the first electronic device determines to implement the second function by using a third electronic device;

the first electronic device implements data transmission with the third electronic device by using a third function transceiver module; and data generated during implementation of the second function is processed by using a third function processing module of the first electronic device, where the third function transceiver module and the third function processing module are independent of the first application.

In this embodiment of this application, the first electronic device may use a plurality of functions of a plurality of other electronic devices simultaneously, and the plurality of electronic devices are in a one-to-one correspondence with the plurality of functions.

For example, if the first function is the photographing function, and the second function is the audio acquisition function, the first electronic device uses the photographing function of the second electronic device and the audio acquisition function of the third electronic device simultaneously. In this case, the first function processing module may be the virtual camera module. The third function processing module may be the virtual audio module.

For another example, if the first function is the photographing function, and the second function is the audio play function, the first electronic device uses the photographing function of the second electronic device and the audio play function of the third electronic device simultaneously. In this case, the first function processing module may be the virtual camera module. The third function processing module may be the virtual sound module.

For another example, if the first function is the audio acquisition function, and the second function is the audio play function, the first electronic device uses the audio acquisition function of the second electronic device and the audio play function of the third electronic device simultaneously. The first function processing module may be the virtual audio module. The third function processing module may be the virtual sound module.

In an embodiment, the method further includes: The first function is the photographing function, and the second function is the audio acquisition function.

In an embodiment, the method further includes: The first application on the first electronic device further invokes a third function;

the first electronic device determines to implement the third function by using a fourth electronic device;

the first electronic device implements data transmission with the fourth electronic device by using a fourth function transceiver module; and data generated during implementation of the third function is processed by using a fourth function processing module of the first electronic device, where the fourth function transceiver module and the fourth function processing module are independent of the first application.

In this embodiment of this application, the first electronic device may use a plurality of functions of a plurality of other electronic devices simultaneously, and the plurality of electronic devices are in a one-to-one correspondence with the plurality of functions.

For example, if the first function is the photographing function, the second function is the audio acquisition function, and the third function is the audio play function, the first electronic device may use the photographing function of the second electronic device, the audio acquisition function of the third electronic device, and the audio play function of the fourth electronic device simultaneously. In this case, the first function processing module may be the virtual camera module. The third function processing module may be the virtual audio module. The fourth function processing module may be the virtual sound module.

In an embodiment, the first function is the photographing function, the second function is the audio acquisition function, and the third function is the audio play function.

In an embodiment, the first application includes any one of an instant messaging application, a video conference application, a live streaming application, and a music application.

In an embodiment, an operating system on the first electronic device is an Android system or a HarmonyOS system.

According to a second aspect, an embodiment of this application provides a readable medium. The readable medium stores instructions, and when the instructions are executed on an electronic device, the electronic device is enabled to perform the data transmission method in the possible implementations of the first aspect.

According to a third aspect, an embodiment of this application provides an electronic device. The electronic device includes:

a memory, configured to store instructions executed by one or more processors of an electronic device; and
a processor that is one of the processors of the electronic device and that is configured to perform the data transmission method, performed by the first electronic device, the second electronic device, or the third electronic device, in the possible implementations of the first aspect.

BRIEF DESCRIPTION OF DRAWINGS

FIG. 4A-1 to FIG. 4A-4 are a schematic flowchart of establishing a wireless communication connection between a television 200 and a tablet computer 300 according to an embodiment of this application;

FIG. 4B-1 to FIG. 4B-4 are a schematic flowchart of configuring a camera parameter for a virtual camera module 202 of a tablet computer 300 and at a hardware abstraction layer of a television 200 according to an embodiment of this application;

FIG. 4D-1 and FIG. 4D-2 are a schematic flowchart of video data transmission according to an embodiment of this application;

DESCRIPTION OF EMBODIMENTS

Illustrative embodiments of this application include but are not limited to an electronic device, a method for data transmission between the electronic device and an external device, and a medium. Technical solutions in embodiments of this application are further described below in detail with reference to the accompanying drawings and embodiments.

Figures 1, 4A:
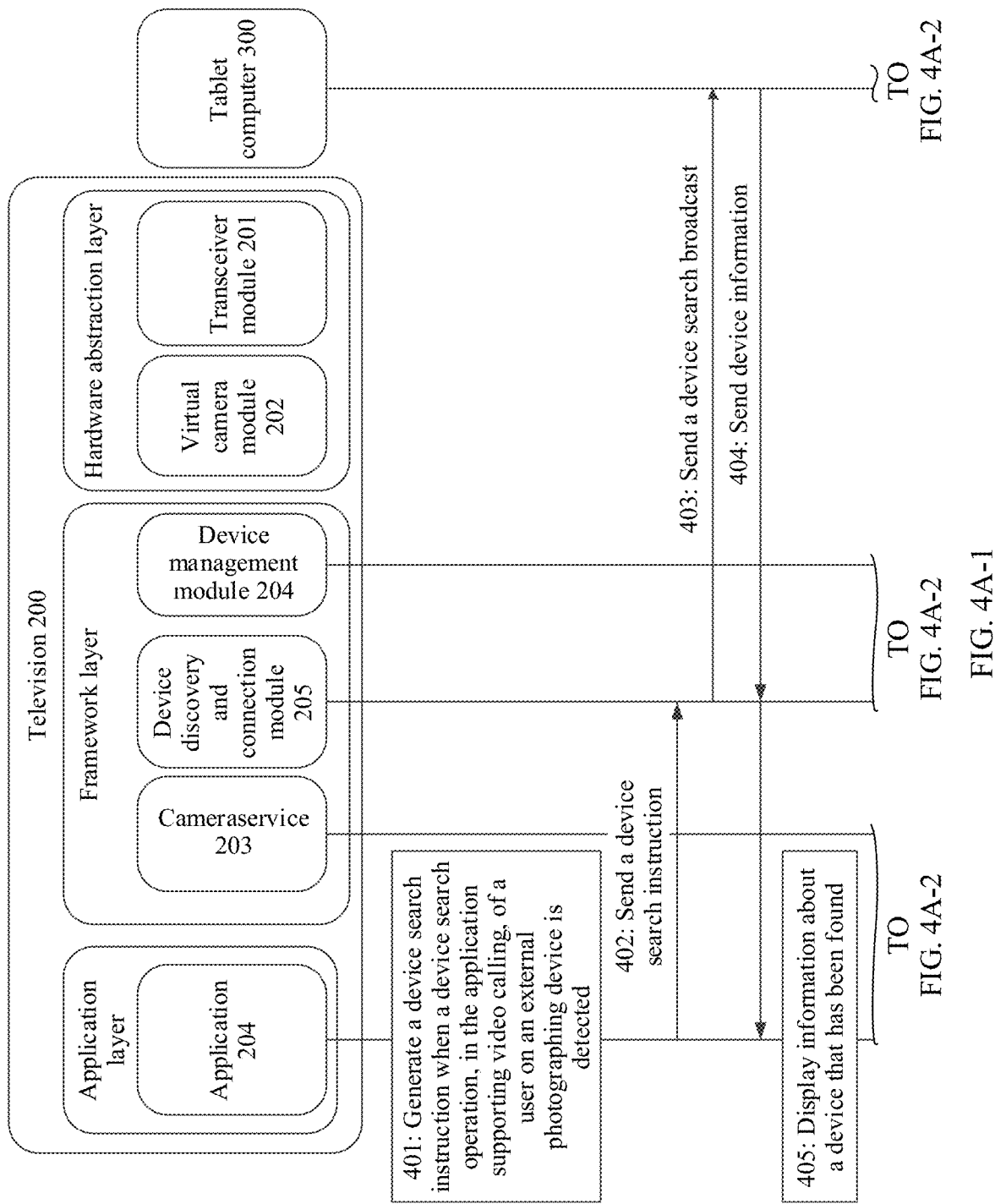
Figures 2, 4A:
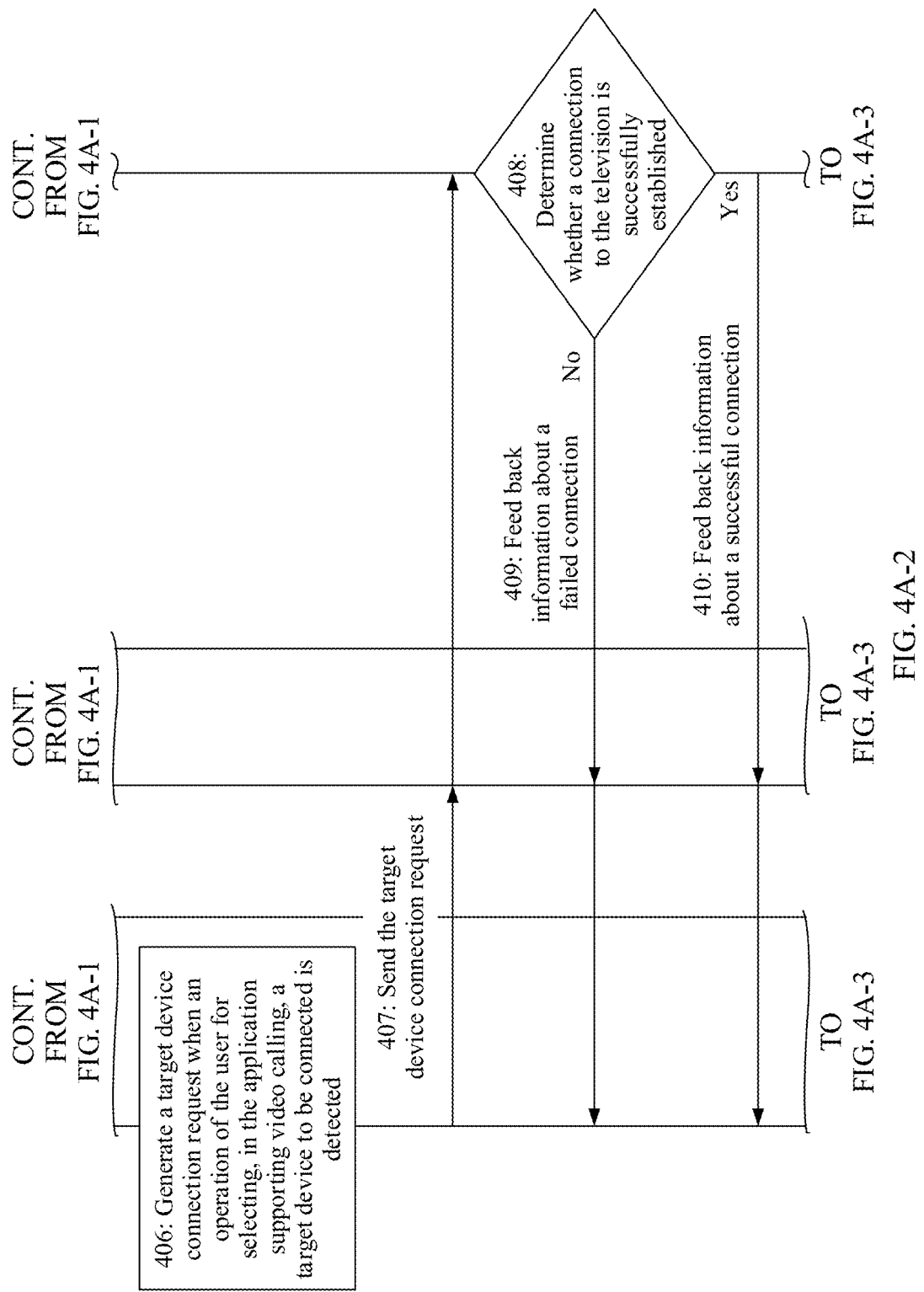
Figures 3, 4A:
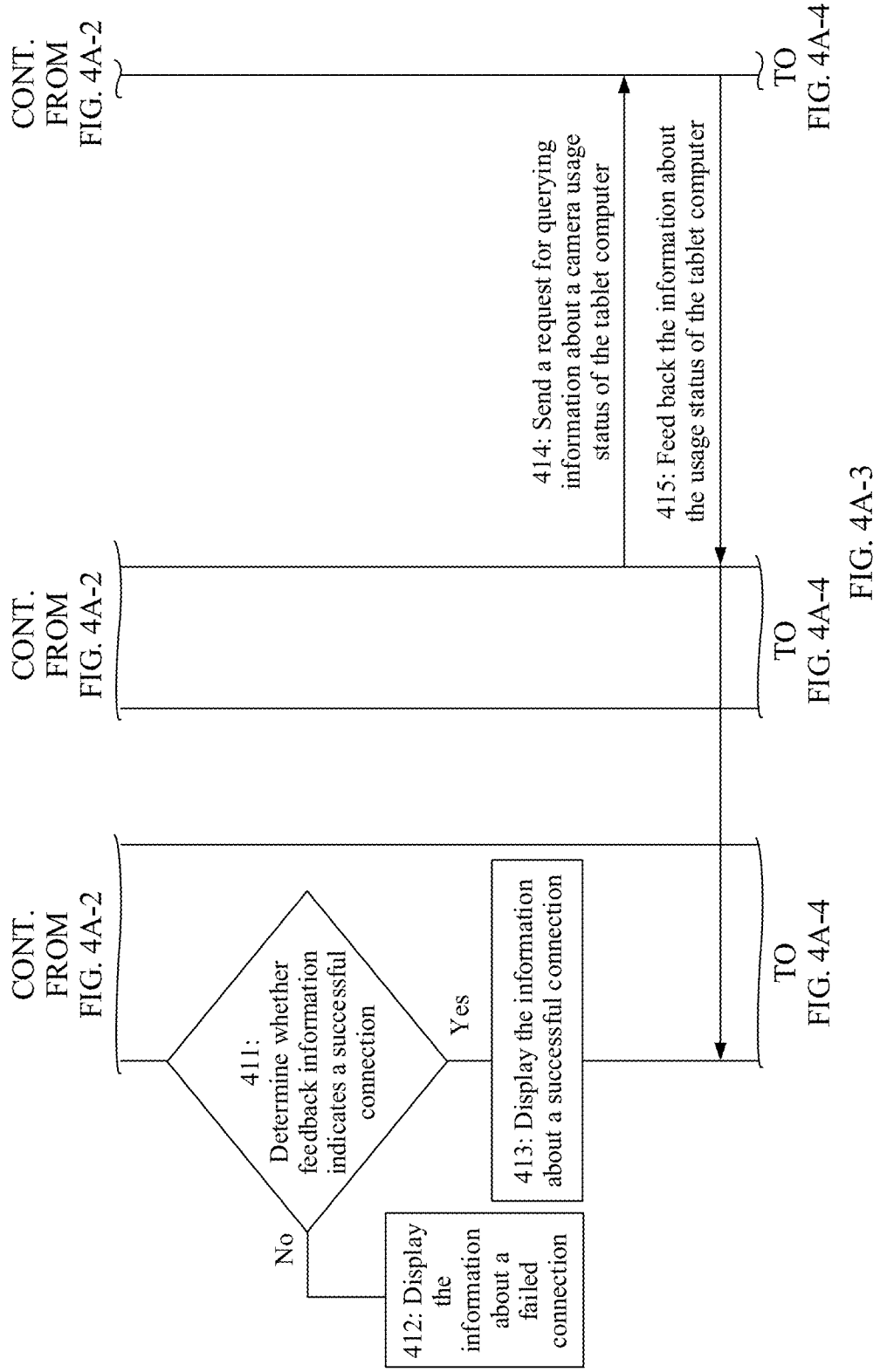

FIG. 2 is a diagram of an application scenario in which an electronic device implements video calling by using at least one other wirelessly connected electronic device according to some embodiments of this application.

In a scenario in which a large-screen device, for example, a television is used to have a video call, some large-screen devices have no camera. In this case, a camera of another device needs to be used to extend a photographing capability of the television, to give full play to an advantage of hardware of the another device. For example, as shown in FIG. 2, in this application scenario, it is assumed that an electronic device 200 has no camera, or another device with better photographing performance needs to be used in distributed application to implement a photographing function. For example, when a user using an electronic device 100 needs to have a video call with a user using the electronic device 200 that has the photographing function, the electronic device 200 needs to complete the video call by using an electronic device 300 that has the photographing function. During the video call, video data captured by the electronic device 300 is transmitted to the electronic device 200, through a wireless connection, for display. In addition, in this process, the user may further perform video recording and photographing by using the electronic device 200.

As described above in the background, when the electronic device 100 extends a video function by using the electronic device 300 that has a camera, there are problems that universality of video data transmission between the devices is relatively low with a relatively long delay. In the scenario shown in FIG. 2, to resolve the problems, in this embodiment of this application, it is set that a non-application layer (for example, a framework layer or a HAL layer) of the electronic device 200 receives and processes the video data sent by the electronic device 300, and the video data is directly transmitted by the electronic device 300 to the electronic device 200, so that a data transmission path between the electronic devices is shortened, and a delay is reduced. In this way, a data transmission speed is improved. In addition, as the electronic device 200 receives, at the non-application layer, the video data sent by the electronic device 300, an associated application does not need to be installed on both the electronic device 300 and the electronic device 200. In this way, universality of data transmission between the devices is improved.

It can be understood that the electronic device 100 applicable to this embodiment of this application may be an electronic device of various types that has a video display function, for example, a mobile phone, a computer, a laptop computer, a tablet computer, a television, a display device, an outdoor display screen, or a vehicle-mounted terminal.

In addition, it can be understood that the electronic device 200 applicable to this embodiment of this application may be an electronic device of various types that has a display function, for example, a mobile phone, a computer, a laptop computer, a tablet computer, a television, a display device, an outdoor display screen, a vehicle-mounted terminal, or a large-screen device.

In addition, it can be understood that the electronic device 300 applicable to this embodiment of this application may be a device of various types that has functions such as video recording and audio recording, for example, a camera system, a microphone system, a mobile phone, a computer, a laptop computer, or a tablet computer.

For ease of describing the technical solutions of this application, an example in which the electronic device 100 is a mobile phone, the electronic device 200 is a large-screen device (for example, a television with a pre-installed HarmonyOS system), and the electronic device 300 is a tablet computer is used below to describe a method for transmitting video data on the television 200 after the tablet computer 300 transmits the acquired video data to the television 200, during a video call between the mobile phone 100 and the television 200.

The television 200 needs to establish a communication connection to the tablet computer 300, to receive the video data acquired by the tablet computer. For example, the television 200 and the tablet computer 300 log onto a same network. For example, the television 200 may establish a Wi-Fi connection to the tablet computer 300 by using a router; the television 200 may directly establish a Wi-Fi P2P connection to the tablet computer 300; the television 200 may directly establish a Bluetooth connection to the tablet computer 300; the television 200 may directly establish a near field wireless connection to the tablet computer 300, where the near field wireless connection includes but is not limited to an NFC (near field communication) connection, an infrared connection, and a UWB (ultra-wideband) connection, ZigBee (ZigBee protocol) connection; or the television 200 may directly establish a mobile network connection to the tablet computer 300, where the mobile network includes but is not limited to a mobile network that supports 2G, 3G, 4G, 5G, and future standard protocols.

Alternatively, after the television 200 detects that a user clicks a "video call" control, the television 200 may display, in an interface for displaying the "video call" control, one or more candidate devices that are currently found by the television 200 and that can acquire image/video data, for the user to make a selection, so that an association relationship is established between a candidate device selected by the user and the television 200. For example, a server may record whether each electronic device has the photographing function. In this case, the television 200 may search, in the server, for an electronic device that has the photographing function and that logs in to a same account (for example, a Huawei account) as the television 200. Further, the television 200 may display an electronic device that is found as a candidate device in the interface for displaying the "video call" control, so that the association relationship is established between the candidate device selected by the user and the television 200. For another example, after screening devices that are found, the television 200 reserves and presents, to the user, one or more candidate devices that can acquire image/video data, for the user to make a selection, so that the association relationship is established between the candidate device selected by the user and the television 200.

Alternatively, an application used to manage a smart household device (for example, a television, a tablet computer, an air conditioner, a sound box, or a refrigerator) inside a household may be installed on the television 200. A smart household application is used as an example. A user may add one or more smart household devices into the smart household application, so that the smart household device added by the user is associated with the television 200. For example, a quick response code containing device information, for example, a device identifier, may be provided on the smart household device. After scanning the quick response code by using the smart household application on the television 200, the user may add the corresponding smart household device into the smart household application, to establish the association relationship between the smart household device and the television 200. In this embodiment of this application, when one or more smart household devices added into the smart household application are successfully accessed, for example, when the television 200 detects a Wi-Fi signal sent by an added smart household device, the television 200 may display the smart household device as the candidate device in the interface for displaying the "video call" control, to prompt the user to select to use a corresponding smart household device to perform synchronous photographing with the television 200.

Alternatively, after the user clicks the "video call" control, the television 200 automatically finds the tablet computer 300 that has a photographing capability, and establishes a wireless communication connection relationship with the tablet computer 300, and the television 300 directly enters a phase of obtaining video data of the tablet computer 300. In this case, the user does not need to manually select a specific device to establish a wireless communication connection relationship with the television 200.

Alternatively, before the user opens an application supporting video calling, the television 200 may have established a network connection to one or more electronic devices that have the photographing function. For example, before the user opens the application supporting video calling, the television 200 has established a wireless communication connection relationship with the tablet computer 300. Subsequently, the television 200 may no longer search for an electronic device that has the photographing function.

Figure 3A:
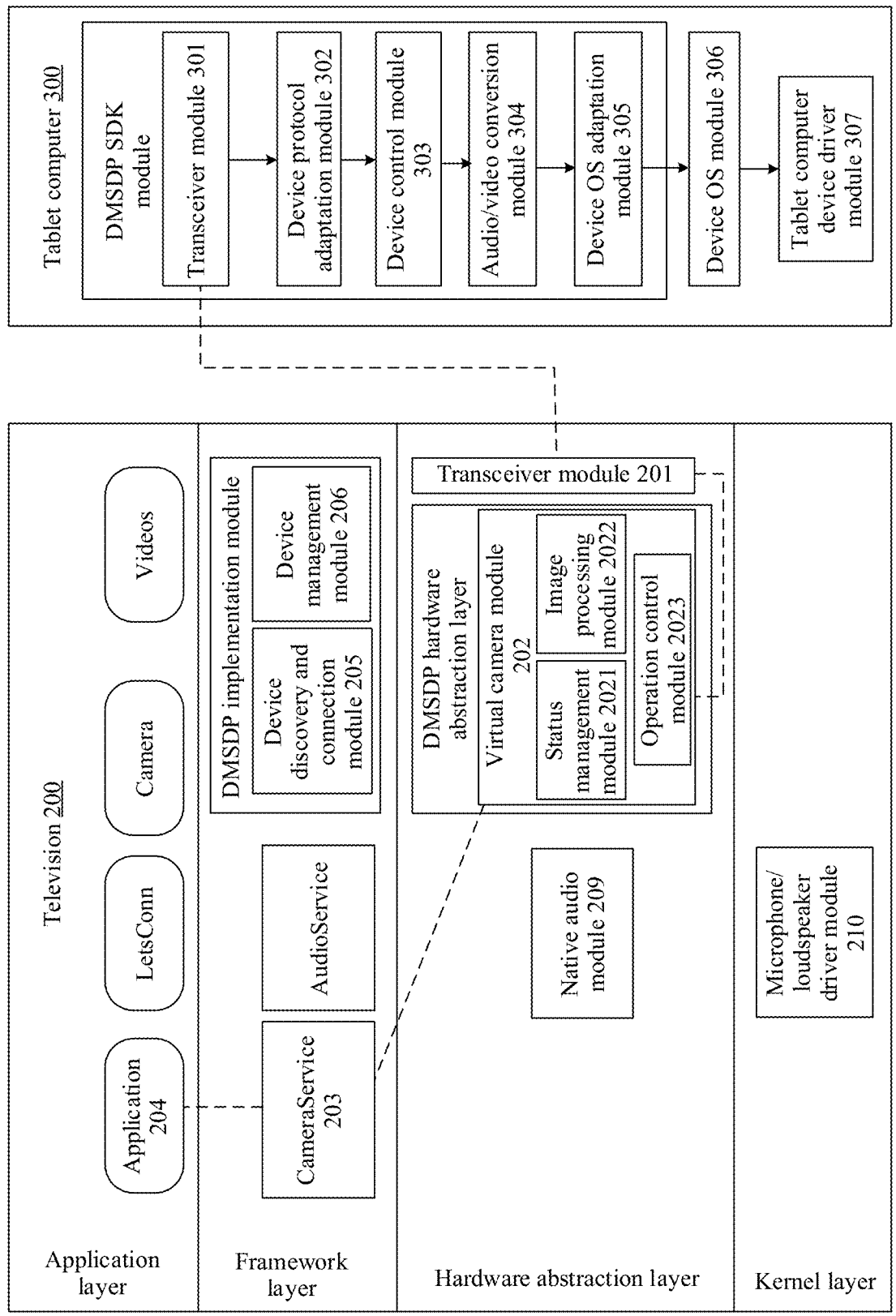
FIG. 3A is a diagram of an architecture of a system for wireless transmission of video data between a tablet computer 300 and a television 200 in the foregoing scenario.

FIG. 3A is a diagram of an architecture of a system for wireless transmission of video data between the tablet computer 300 and the television 200 after the communication connection relationship is established in the foregoing scenario. The system is used to implement the data transmission method in this application.

As shown in FIG. 3A, the tablet computer 300 includes a transceiver module 301, a device protocol adaptation module 302, a device control module 303, an audio/video conversion module 304, a device OS adaptation module 305, a device OS module 306, and a tablet computer device driver module 307.

The transceiver module 301 is configured to: receive a control instruction sent by a device on the television side 200, and send a response instruction and video data that are on the tablet computer side 300 to the television 200. The device protocol adaptation module 302 is configured to perform basic protocol interaction, for example, capability negotiation or channel negotiation, with the television 200. The device control module 303 is configured to manage and operate an audio and video module on the tablet computer side 300, for example, enable/disable a camera, a loudspeaker, or the like. The audio/video conversion module 304 is configured to convert received/acquired audio/video data into a target encoding/decoding format that is needed. The device OS adaptation module 305 may support different types of cameras, provide a unified interface of an operating system for the different types of cameras, and support a cross-platform operation. The device OS module 306 is configured to implement interface invoking in the operating system on a device. The tablet computer device driver module 307 is configured to control and operate a hardware module, for example, the camera and the loudspeaker, of the tablet computer 300.

Still refer to FIG. 3A. The television 200 includes a transceiver module 201, a virtual camera module 202, CameraService 203, and an application 204 supporting video calling.

The transceiver module 201 is configured to receive video data sent by the external tablet computer 300.

The virtual camera module 202 is configured to: manage a process of obtaining the video data, and process the video data based on a preset camera parameter. For example, the virtual camera module 202 performs processing, for example, decoding, color space conversion, scaling, rotation, mirroring, and filling on an image or the video data based on the preset camera parameter.

Specifically, the virtual camera module 202 includes a status management module 2021, an image processing module 2022, and an operation control module 2023. The status management module 2021 is configured to control a usage status of the tablet computer 300, so that when the television 200 determines that a user enables a photographing function of the application 204 supporting video calling, the television 200 has the photographing capability when using the camera. The operation control module 2023 is configured to: open a video data obtaining channel, configure a format for video or image data, and process an instruction for requesting or disabling to obtain the video data or image data at the framework layer. The image processing module 2022 is configured to perform processing, for example, decoding, color space conversion, scaling, rotation, mirroring, and filling on the video data based on the preset camera parameter.

The application 204 supporting video calling may be, but is not limited to, a phone application, WeChat, WeLink, or the like.

In some embodiments, after the tablet computer 300 transmits the acquired video data to the television 200, a transmission path of the video data in the television 200 may be as follows:

The tablet computer 300 transmits the captured video data to the transceiver module 201 at the hardware abstraction layer of the television 200 by using the transceiver module 301. Then, the transceiver module 201 converts the video data into a format (for example, a PCM format) required by the hardware abstraction layer, and transmits the video data to the virtual camera module 202. In this case, to slow down an excessively high receiving rate of the transceiver module 201, a received video cannot be displayed on the television 200 in real time, or the transceiver module 201 may cache the video data and convert the video data into the format required by the hardware abstraction layer. Then, the virtual camera module 202 transmits the video data that has been converted into the format required by the hardware abstraction layer to CameraService 203 at a framework layer of the television 200. CameraService 203 converts the video data into a format satisfying the preset camera parameter (for example, scales the video data to a fixed size), and then transmits the video data to the application 204 supporting video calling that is at an application layer of the television 200. In a video window of the application 204 supporting video calling, a video transmitted from the tablet computer 300 is displayed based on the captured video data. In this way, the video data that is acquired by the tablet computer 300 by photographing is obtained cyclically and displayed on the television 200.

In this way, the tablet computer 300 directly transmits the video data to the television 200, so that a data transmission path between the tablet computer 300 and the television 200 is shortened, a delay is reduced, and a data transmission speed is improved. In addition, as inside the television 200, the video data sent by the tablet computer 300 is received at the non-application layer, an application associated with the television 200 does not need to be installed on the tablet computer 300. In this way, universality of data transmission between the devices is improved.

In some other embodiments of this application, the television 200 may obtain video data of a camera of another electronic device by wireless communication, or may obtain video data of an external camera through a wired connection (by using a connector, for example, a USB). Data transmission paths for a user to obtain video data of an external camera in wired and wireless manners are different. The user may select, as desired, a video data obtaining manner based on an actual condition.

Figure 3B:
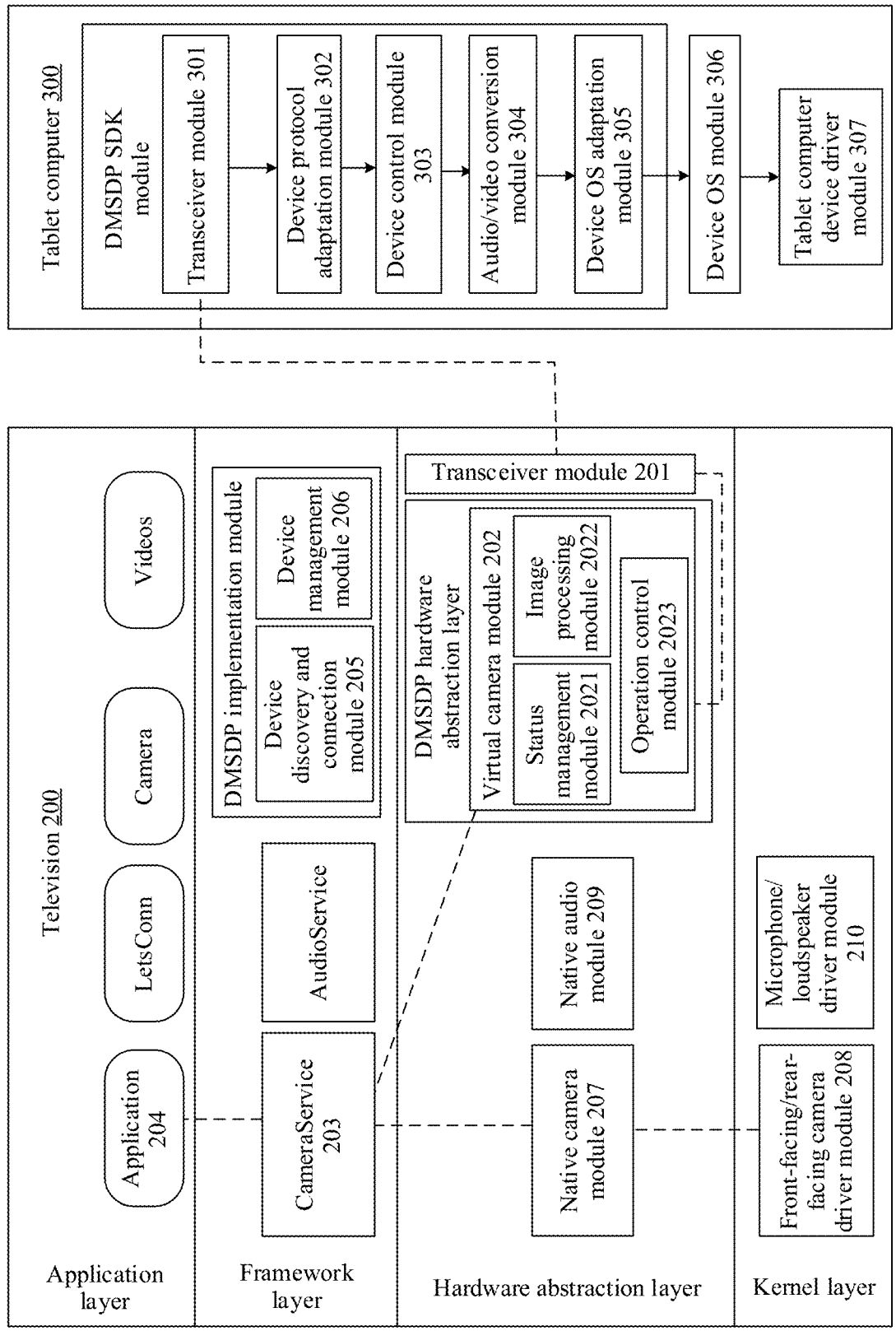
FIG. 3B is a diagram of an architecture of another system for wireless transmission of video data between the tablet computer 300 and the television 200 in the foregoing scenario.

Specifically, FIG. 3B is a diagram of an architecture of another system for wireless transmission of video data between the tablet computer 300 and the television 200 in the foregoing scenario.

As shown in FIG. 3B, the television 200 is connected to the external tablet computer 300 in a pluggable manner, for example, by using a USB, so that after shooting a video, the tablet computer 300 transmits captured video data to a native camera module 207 at the hardware abstraction layer of the television 200 by using a front-facing/rear-facing camera module 208 at a kernel layer, then to a CameraService module 203 at the framework layer of the television 200, and further to the application 204 supporting video calling that is at the application layer of the television 200 for display.

When the television 200 is connected to the tablet computer 300 by wireless communication, a specific data transmission process is the same as that shown in FIG. 3A. Details are not described herein again.

To sum up, a data flow direction when the television 200 obtains the video data of the external camera by wireless communication is different from a data flow direction when the television 200 obtains the video data of the external camera through a wired connection (by using a connector, for example, a USB). Specifically, when the television 200 is connected to the tablet computer 300 of another electronic device in a wireless manner, as shown in FIG. 3B, in this application scenario, the "virtual camera module" is added into the hardware abstraction layer (HAL layer) in this embodiment of this application, and this module is apposed to the native camera module 207 and a native audio module 209 that are in an existing Android system. Therefore, in a video calling scenario, a transmission path of a video data flow in the television 200 is from the transceiver module 201 to the virtual camera module 202, then to CameraService 203, and further to the application 204 supporting video calling. However, when the television 200 is connected to the external tablet computer 300 in a wired manner, for example, when the external tablet computer 300 is used for photographing, as shown in FIG. 3B, in this application scenario, a data flow direction is from the front-facing/rear-facing camera driver module 208 (for driving the external tablet computer 300) to the native camera module 207, then to CameraService 203, and further to the application 204 supporting video calling. It can be learned that a direction of a data flow transmitted by the external tablet computer 300 and received by the television 200 covers the virtual camera module 202, and a direction of a data flow acquired by the external tablet computer 300 covers the native camera module 207. In this way, data flows in a system on the television 200 go in different directions and do not interfere with each other. When the video data is obtained from the external tablet computer 300 and played, the photographing function of the external tablet computer 300 is not affected for use, so that the television 200 becomes more powerful, thereby improving user experience.

Three phases in which the television 200 establishes a wireless communication connection to the tablet computer 300 and performs information query on the tablet computer 300, a camera parameter is configured for the tablet computer 300 and the virtual camera module 202 at the hardware abstraction layer of the television 200, and the television 200 obtains the video data of the tablet computer 300 are described below.

Figure 1:
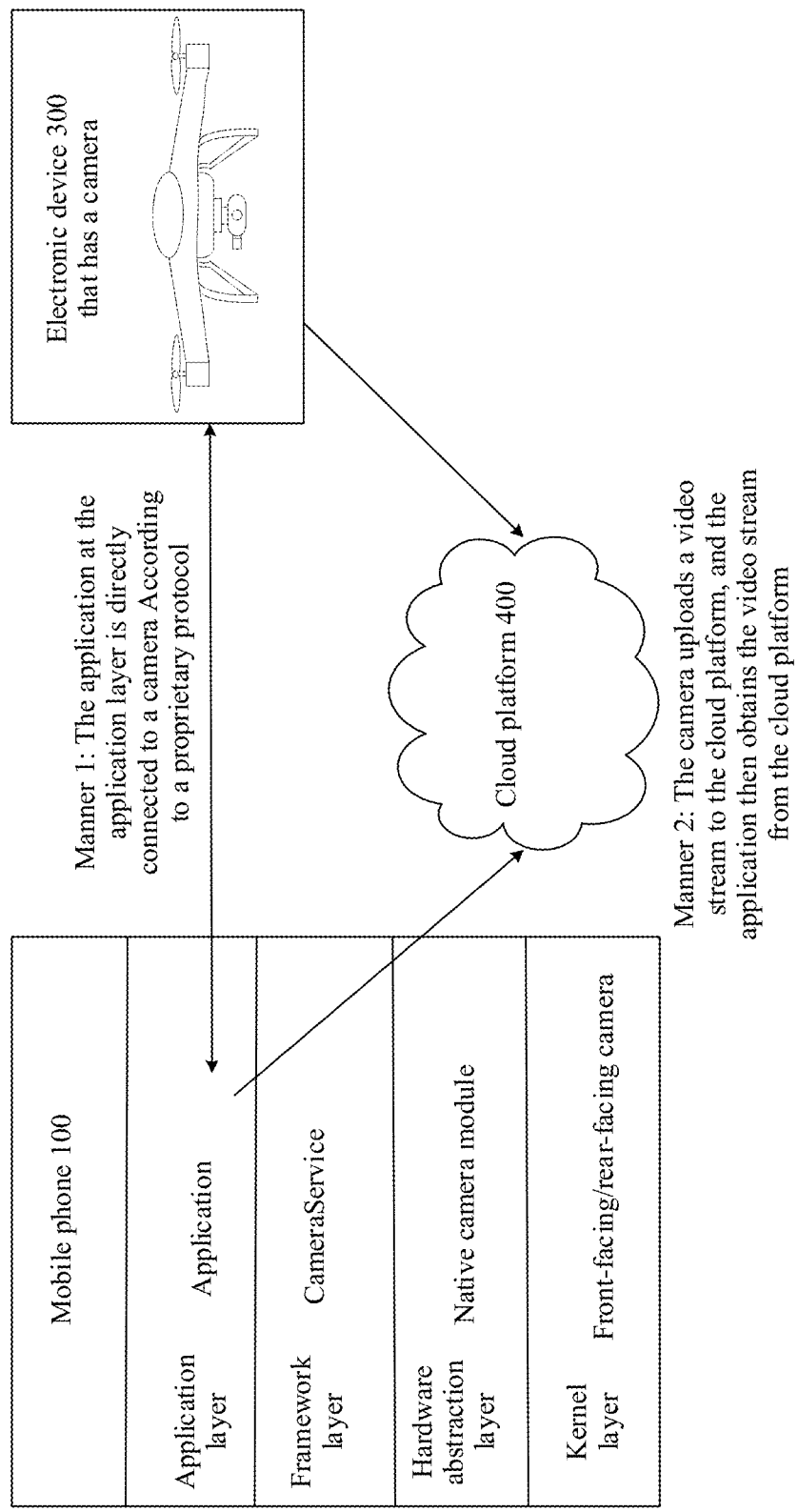
FIG. 1 shows two manners in which a mobile phone 100 obtains video data of an electronic device 300 that is on an unmanned aerial vehicle and that has a camera.
Figures 1, 4B:
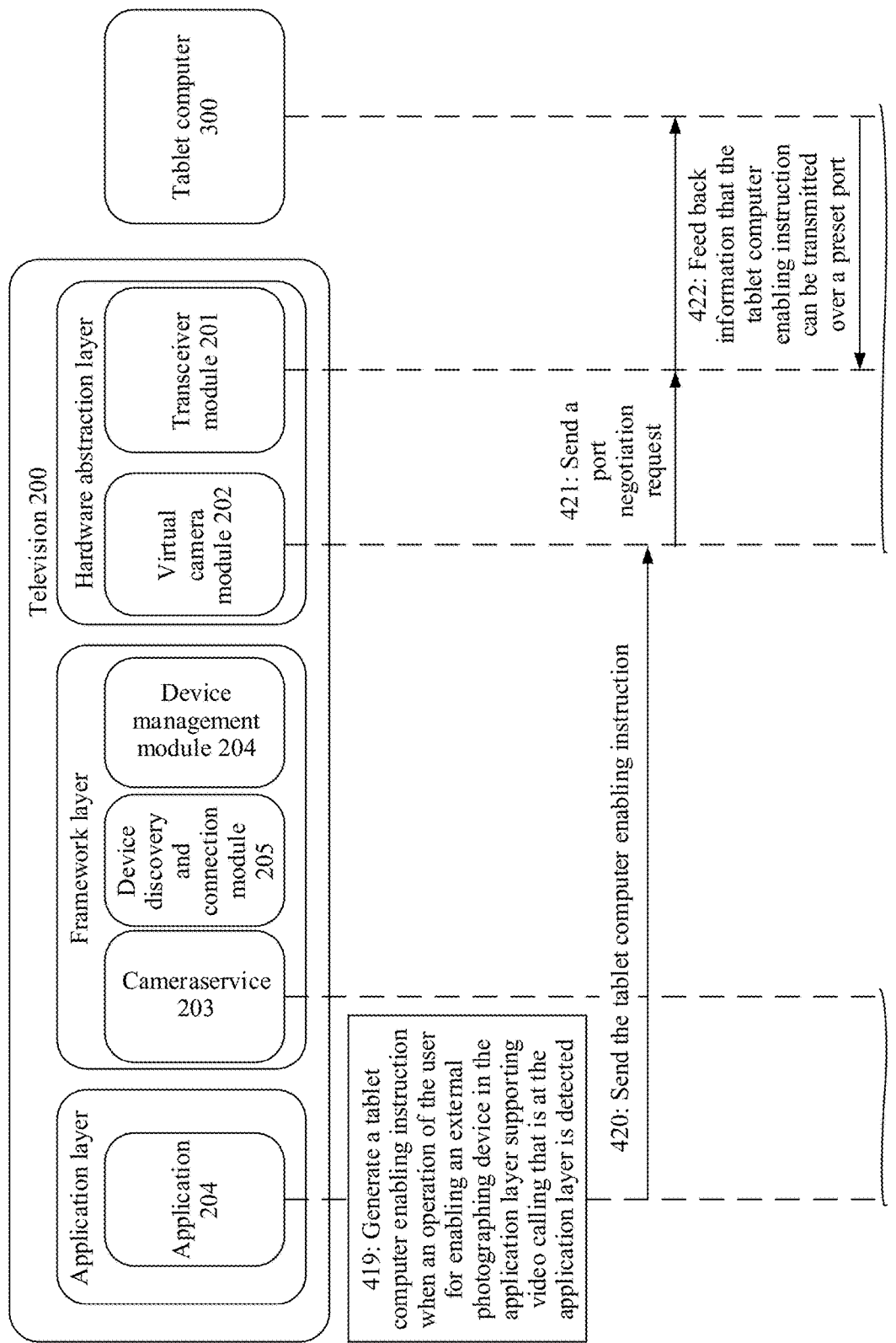
Figures 2, 4B:
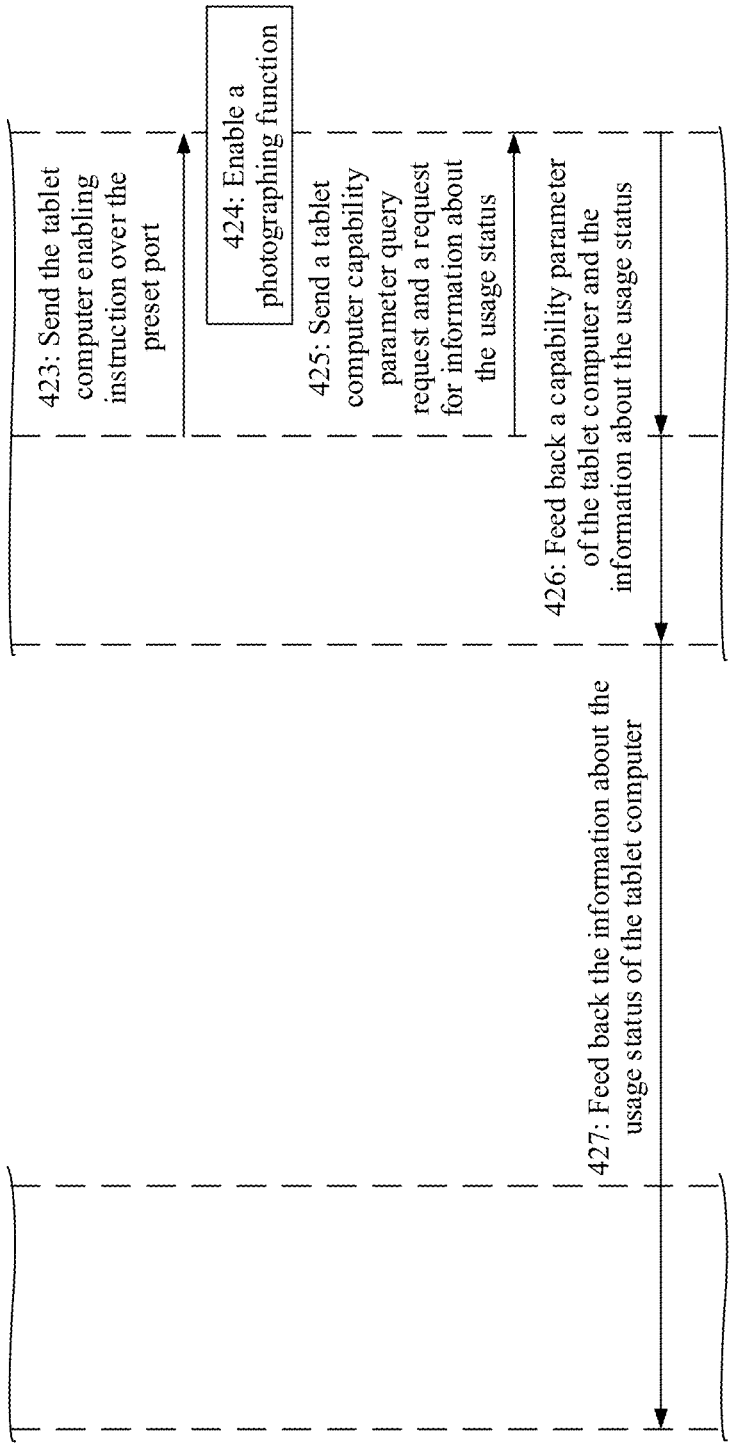
Figure 4B:
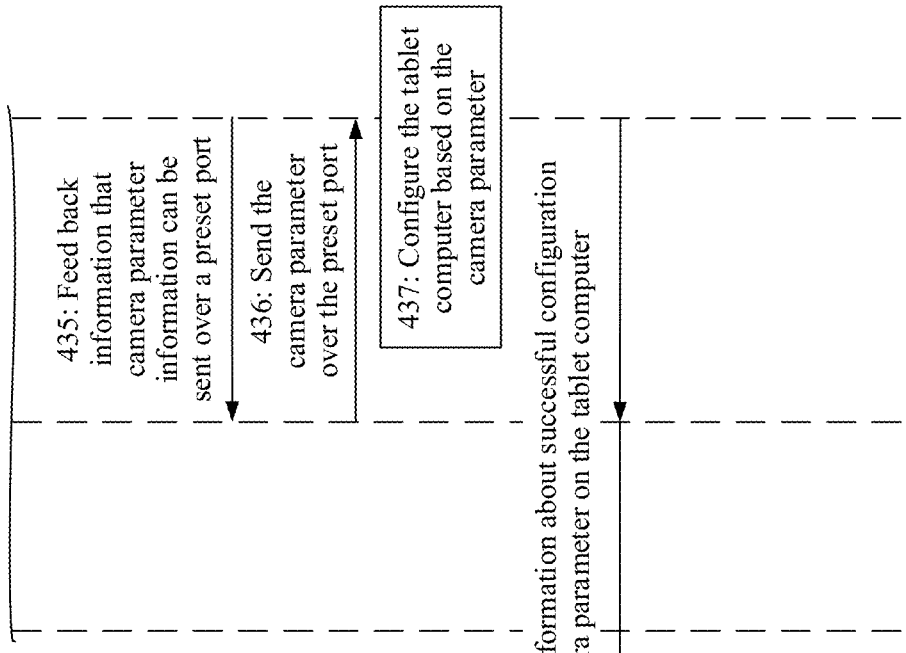
Figure 4:
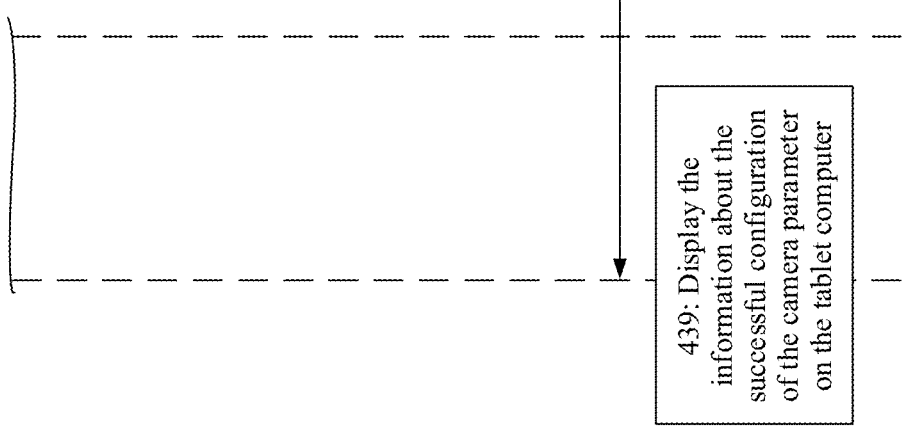

A Phase in which the Television 200 Establishes a Wireless Communication Connection to the Tablet Computer 300 and Performs Information Query on the Tablet Computer 300:

FIG. 4A-1 to FIG. 4A-4 are a schematic flowchart of establishing a wireless communication connection between the television 200 and the tablet computer 300 according to an embodiment of this application. As shown in FIG. 4A-1 to FIG. 4A-4, the following operations are included.

Operation 401: The application 204 supporting video calling generates a device search instruction when the television 200 detects a device search operation, in the application 204 supporting video calling, of a user on an external photographing device.

When an external camera is needed for extending a photographing function, the user may click a corresponding control in the application 204 supporting video calling, to search for a photographing device that can be externally connected. The device search operation is used to search for a device around the television 200 or at a remote end that can establish a wireless communication connection to the television 200.

According to some embodiments of this application, FIG. 5A to FIG. 5M are schematic diagrams of changes of an operation interface in which a user specifies an external camera on the television 200. Specifically, the following is included.

Figure 5A:
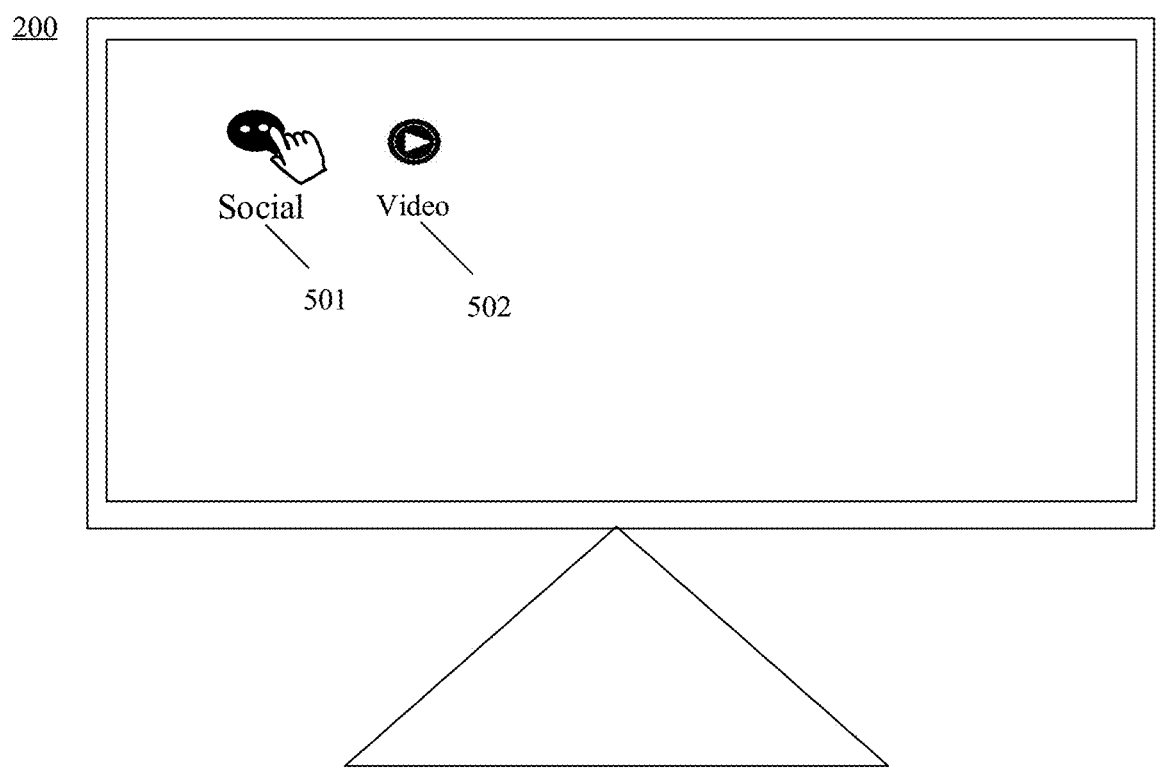
FIG. 5A to FIG. 5M are schematic diagrams of changes of an operation interface in which a user specifies an external camera on a television 200.

As shown in FIG. 5A, some applications, for example, an application 501 supporting video calling (for example, an instant messaging application or a video conference application) and an entertainment video application 502 (for example, a live streaming application or a music application), are displayed in a display interface on the television 200. It is assumed that the user wants to use the application 501 supporting video calling. The user may click, by using a remote control or a wireless mouse function, or a finger of the user, a "social" control 501 on the television 200, to enter an operation interface of the application supporting video calling.

Figure 5B:
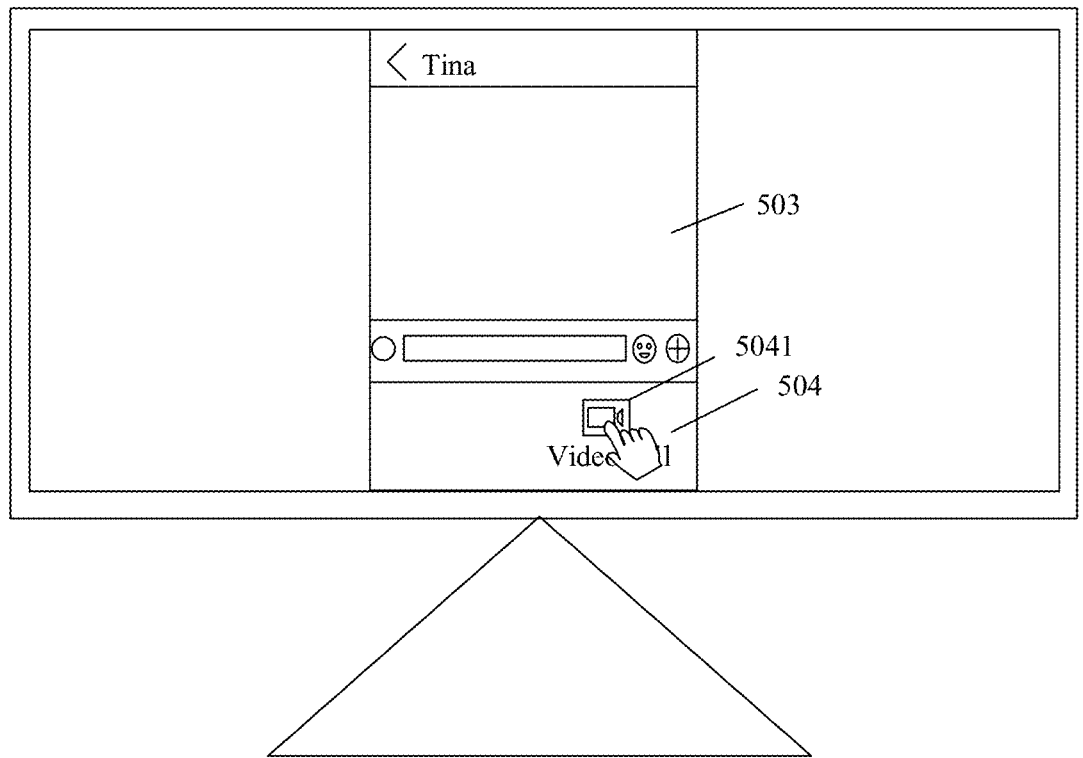

As shown in FIG. 5B, the user enters an operation interface for chatting of the application 501 supporting video calling. A dialog box 503 and a function control box 504 are displayed in the operation interface, and the function control box 504 includes a "video call" control 5041. It is assumed that the user wants to have a video call with a contact in the application 501 supporting video calling. The user may click the "video call" control 5041 to enable a video calling function.

Figure 5C:
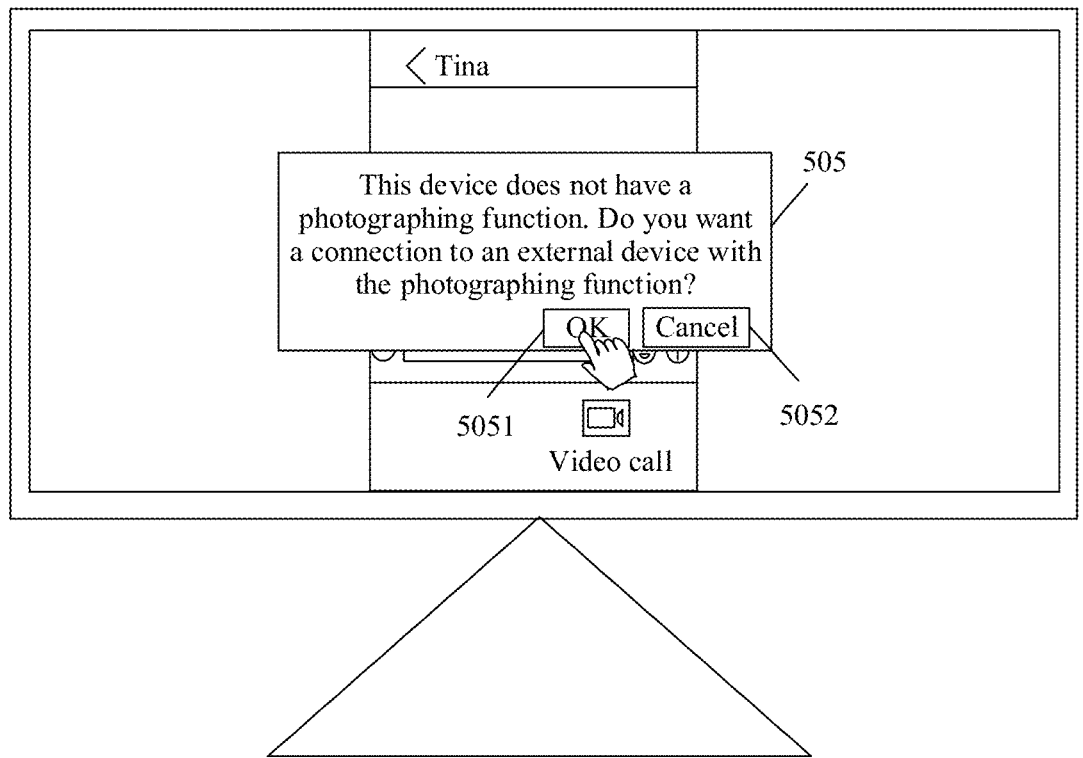

However, if the television 200 is not configured with a camera or is not connected to a camera in a pluggable manner, for example, by using a USB, the television 200 cannot use the video calling function. As shown in FIG. 5C, the television 200 may display prompt information indicating that the video calling function cannot be used. For example, the television 200 displays, in a prompt box 505, the prompt information "This device does not have a photographing function. Do you want a connection to an external device with the photographing function?" The prompt box 505 may further include an "OK" selection control 5051 and a "Cancel" selection control 5052 for the user to make a selection.

After the user clicks the "OK" selection control 5051, the application 204 supporting video calling that is at the application layer of the television 200 responds to the click operation of the user, and determines that the operation of the user is the device search operation. In addition, it can be understood that, in another embodiment, the device search operation may alternatively be, but is not limited to, double-clicking the "video call" control 5041 in FIG. 5B, or long-pressing the "video call" control 5041 in FIG. 5B. It can be understood that, after the user clicks the "Cancel" selection control 5052, the television 200 closes the prompt box 505, and the prompt box 505 disappears.

Operation 402: The application 204 supporting video calling that is at the application layer of the television 200 sends the device search instruction to a device discovery and connection module 205 at the framework layer. The device search instruction is used to search for the device around the television 200 or at a remote end that can be wirelessly connected.

In this embodiment of this application, the device discovery and connection module 205 at the framework layer of the television 200 is configured to: search for and identify a nearby or remote electronic device, and establish a wireless communication connection to an identified electronic device.

In addition, in some other embodiments, CameraService 203 is responsible for communication. The application 204 supporting video calling that is at the application layer of the television 200 may alternatively first send the instruction for starting device search to CameraService 203. When the instruction for starting device search is received, CameraService 203 then sends the instruction for starting device search to the device discovery and connection module 205 at the framework layer.

Operation 403: The device discovery and connection module 205 at the framework layer of the television 200 sends a device search broadcast.

For example, the television may send the device search broadcast by using a near field communication technology, for example, Bluetooth, or may send the device search broadcast by using a far field communication technology, for example, a wireless technology. In this case, the user may enable a communications function, for example, Bluetooth, of the tablet computer 300, so that the television 200 finds and establishes a wireless communication connection to the tablet computer 300.

Operation 404: The tablet computer 300 sends, by using the device discovery and connection module 205 at the framework layer of the television 200, device information to the application 204 supporting video calling that is at the application layer of the television 200.

It can be understood that the device information is used to uniquely determine a device corresponding to the device information, and establish a wireless communication connection to the device. The device information may be, but is not limited to, a wireless access point name of the device that has been found, a name of the device, or a MAC address, an IP address, and the like of the device.

In this embodiment of this application, when the device search broadcast sent by the television 200 is received, the tablet computer 300 sends the device information to the television 200. The device discovery and connection module 205 at the framework layer of the television 200 can detect the information and receive the message. The device discovery and connection module 205 at the framework layer of the television 200 sends the device information to the application 204 supporting video calling that is at the application layer, so that the television 200 displays the device that has been found and that can establish a wireless communication connection. For example, when the application 204 supporting video calling that is at the application layer of the television 200 receives the device information of the tablet computer 300, the television 200 may display the tablet computer 300 to the user.

Operation 405: The application 204 supporting video calling that is at the application layer of the television 200 displays the information about the device that has been found.

The information about the device that has been found may be a wireless access point name, a device name, and the like of a nearby or remote device that can establish a wireless communication connection to the television.

For example, the television 200 may search for an electronic device in a same Wi-Fi network as the television 200. Further, the television 200 may send a query request to each electronic device in the same Wi-Fi network, and trigger an electronic device that receives the query request to send a response message to the television 200, where the response message may indicate whether the electronic device has a photographing function. In this case, the television 200 may determine, based on the received response message, an electronic device, in the current Wi-Fi network, that has the photographing function. Further, the television 200 may display, in a prompt box 506, the electronic device that has the photographing function as the candidate device.

Figure 5D:
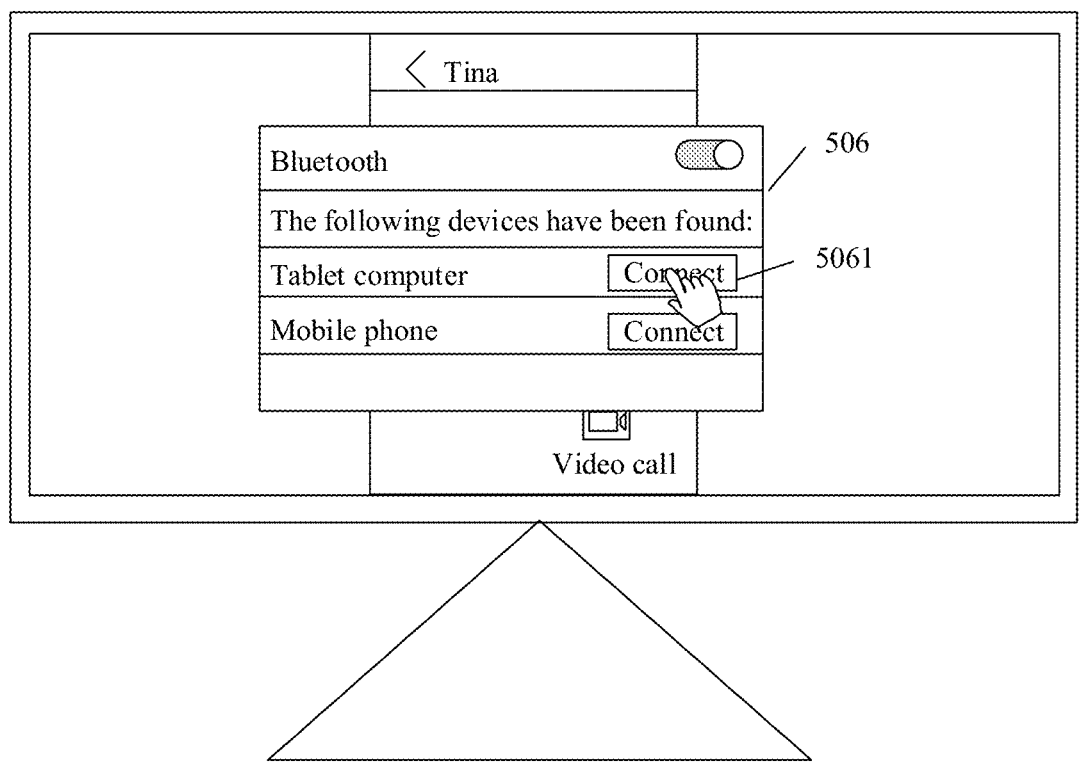

As shown in FIG. 5D, the television 200 displays the prompt box 506. The prompt box 506 includes the name of the device that has been found. For example, the television 200 displays the following devices that have been found: a tablet computer and a mobile phone. In addition, a "connect" control 5061 used to establish wireless communication with the tablet computer or the mobile phone is displayed in the prompt box 506.

Operation 406: The television 200 generates a target device connection request when an operation of the user for selecting, in the application 204 supporting video calling, a target device to be connected is detected.

The target device connection request is used to request the target device to establish a wireless communication connection relationship with the television 200. For example, the user selects the "connect" control 5061 in the prompt box 506 in FIG. 5D by using a remote control, a wireless mouse function, or a finger of the user. In this case, the application 204 supporting video calling generates the target device connection request, to request to establish a connection to the tablet computer 300.

It can be understood that there may be a plurality of pieces of information about the devices that have been found. After the user selects, from the devices that have been found, a device that needs to be connected, the device selected by the user is the target device. For example, still refer to FIG. 5D. When the user clicks the "connect" control 5061 in the prompt box 506 corresponding to the tablet computer, the target device is the tablet computer 300.

Operation 407: The application 204 supporting video calling that is at the application layer of the television 200 sends the target device connection request to the tablet computer 300 by using the device discovery and connection module 205 at the framework layer, to request to establish a wireless communication connection relationship with the tablet computer 300.

It can be understood that, when the device discovery and connection module 205 at the framework layer of the television 200 receives the target device connection request sent by the television 200 by using the application 204 supporting video calling that is at the application layer, the device discovery and connection module 205 at the framework layer of the television 200 sends the target device connection request to the tablet computer 300.

Operation 408: The tablet computer 300 determines whether a connection to the television 200 is successfully established, and if no, operation 409 is performed; or if yes, operation 410 is performed.

Operation 409: The tablet computer 300 feeds back, by using the device discovery and connection module 205 at the framework layer of the television 200, information about a failed connection to the application 204 supporting video calling.

It can be understood that, when a wireless communication connection is not successfully established between the tablet computer 300 and the television 200, the tablet computer 300 feeds back, to the device discovery and connection module 205 at the framework layer of the television 200, the information about a failure of connecting to the target device. Then, the device discovery and connection module 205 at the framework layer of the television 200 sends, to the application 204 supporting video calling that is at the application layer, the feedback information about the failure of connecting to the target device, so that the television 200 determines to display, by using the application 204 supporting video calling that is at the application layer, the information about the failure of connecting to the target device.

> Operation 410: The tablet computer 300 feeds back, to the application 204 supporting video calling, by using the device discovery and connection module 205 at the framework layer of the television 200, information about a successful connection.

It can be understood that, after a wireless communication connection is established between the tablet computer 300 and the television 200, the tablet computer 300 feeds back, to the device discovery and connection module 205 at the framework layer of the television 200, the information about the successful connection to the target device. Then, the device discovery and connection module 205 at the framework layer of the television 200 sends, to the application 204 supporting video calling that is at the application layer, the feedback information about the successful connection to the target device, so that the television 200 displays, by using the application 204 supporting video calling that is at the application layer, the information about the successful connection to the target device.

> Operation 411: The application 204 supporting video calling on the television 200 determines whether the feedback information indicates the successful connection to the target device. If no, Operation 412 is performed. If yes, Operation 413 is performed.
>
> Operation 412: The application 204 supporting video calling on the television 200 displays the information about the failed connection to the user.

Figure 5E:
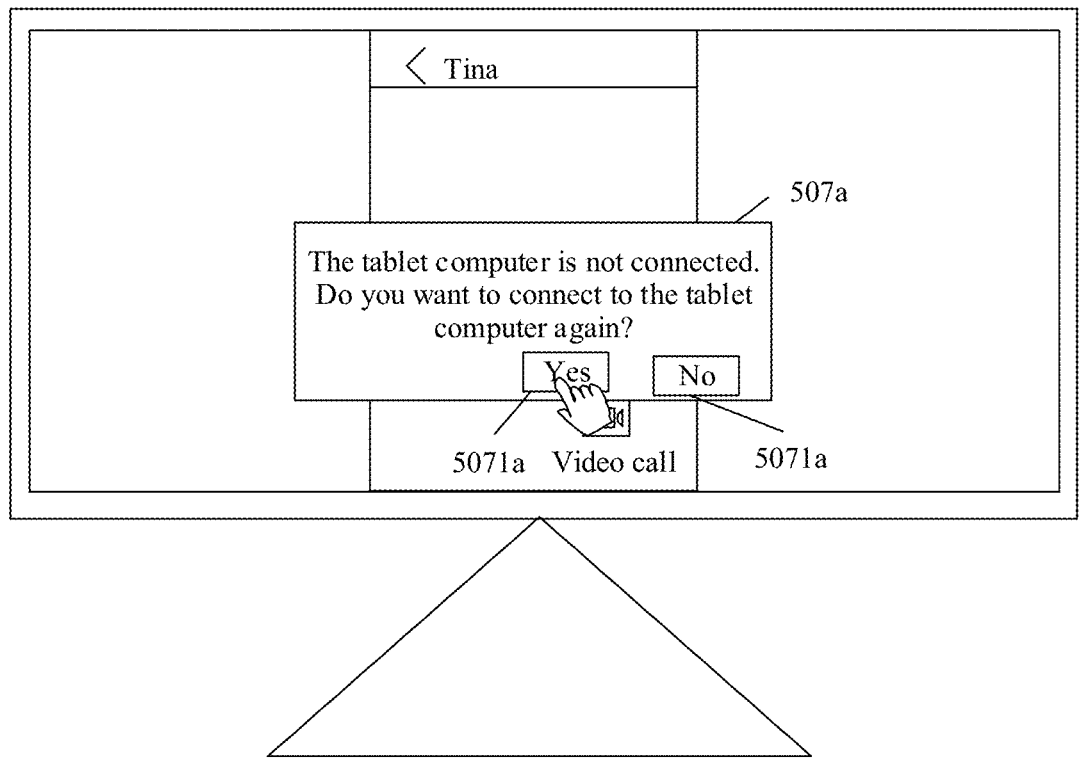

It can be understood that, in some embodiments, the television 200 may prompt the user whether to connect to the tablet computer 300 again. For example, as shown in FIG. 5E, the television 200 displays a prompt box 507a, and the prompt box 507a displays prompt information: The tablet computer is not connected. Do you want to connect to it again? If the user selects to reconnect to the tablet computer, operation 407 is repeated. For example, the prompt box 507a further includes a "yes" selection control 5071a and a "no" selection control 5072a for the user to make a selection.

After the user clicks the "yes" selection control 5071a, the application 204 supporting video calling that is at the application layer of the television 200 responds to the click operation of the user, determines that the operation of the user is for a reconnection to the tablet computer, and performs an operation of reconnecting to the tablet computer. After the user clicks the "no" selection control 5072a, the television 200 responds to the operation, and the television 200 closes the prompt box 505a. The prompt box 507a disappears, and an operation of reconnecting to the tablet computer is not performed.

> Operation 413: The application 204 supporting video calling on the television 200 displays the information about the successful connection to the user.

Figure 5F:
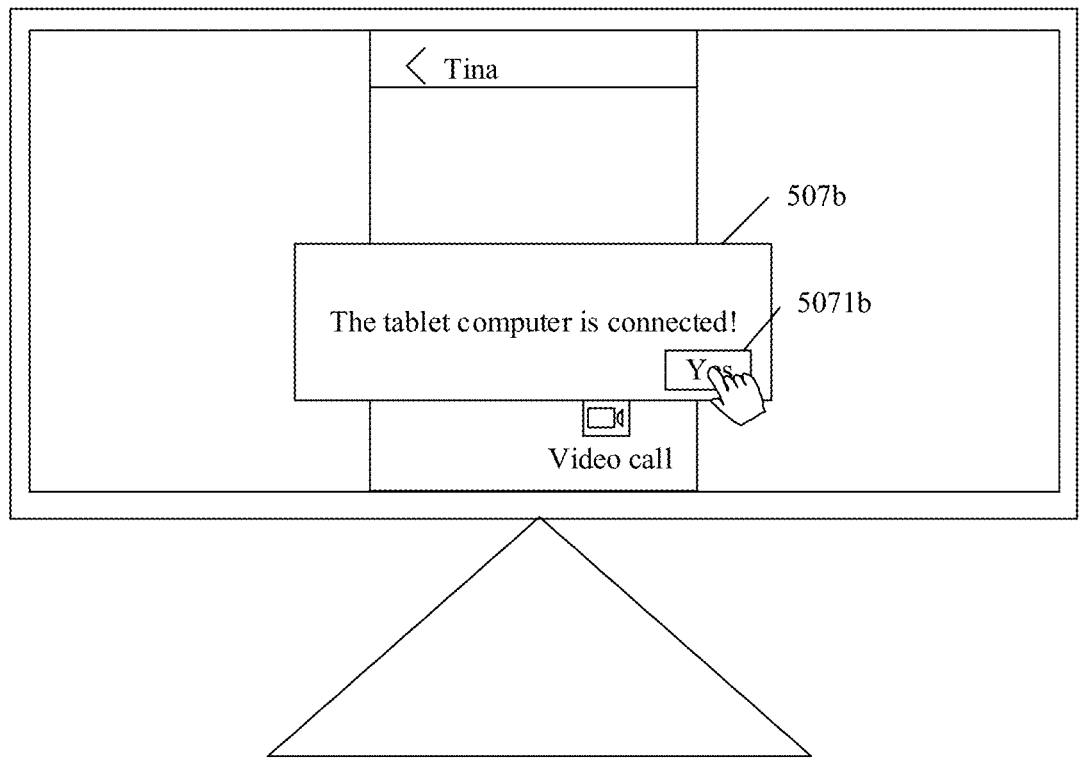

For example, as shown in FIG. 5F, the television 200 displays, in a prompt box 507b, prompt information "The tablet computer is connected". The prompt box 507 further includes a "yes" control 5071b. It can be understood that after the user clicks the "yes" control 5071, the television 200 closes the prompt box 507, and the prompt box 507 disappears.

> Operation 414: The television 200 sends, by using a device management module 204 at the framework layer, a request for querying information about a camera usage status of the tablet computer to the tablet computer 300.

It can be understood that the information about the camera usage status of the tablet computer herein may be that a photographing function of the tablet computer 300 is used, or may be that a photographing function of the tablet computer 300 is not used. A camera of the tablet computer 300 can be used by the television 200 only when the camera of the tablet computer 300 is not used by another device. Therefore, the television 200 sends, by using the device management module 204 at the framework layer, the request for querying the information about the camera usage status to the tablet computer 300, to determine whether the camera of the tablet computer 300 is used by another device.

> Operation 415: The tablet computer 300 feeds back, by using the device management module 205 at the framework layer of the television 200, the information about the camera usage status of the tablet computer to the application 204 supporting video calling that is at the application layer.

It can be understood that, the tablet computer 300 may determine, by reading file content in a directory of a local memory, whether the camera is used, and feed back, to the device management module 205 at the framework layer of the television 200, information that the camera is being used or information that the camera is not used. Specifically, if the television 200 finds a message, stored in the directory of the tablet computer 300, indicating that the camera is not used by another device, it is determined that the camera of the tablet computer 300 is not used by another device. The information that the camera of the tablet computer 300 is not used by another device is fed back to the television 200. If the television 200 finds a message, stored in the directory of the tablet computer 300, indicating that the camera is used by another device, it is determined that the camera of the tablet computer 300 is used by another device. The information that the camera of the tablet computer 300 is used by another device is fed to the television 200.

> Operation 416: The application 204 supporting video calling on the television 200 determines whether the received information about the camera usage status indicates that the camera is not used. If yes, operation 417 is performed; or if no, operation 418 is performed.
>
> Operation 417: The television 200 displays the information that the camera is used.

When determining that the received information about the usage status indicates that the camera is used, the application 204 supporting video calling on the television 200 prompts the user that the tablet computer 300 is used and cannot be used by the television 200 for video calling, and prompts the user that the tablet computer 300 is unavailable.

Figure 5G:
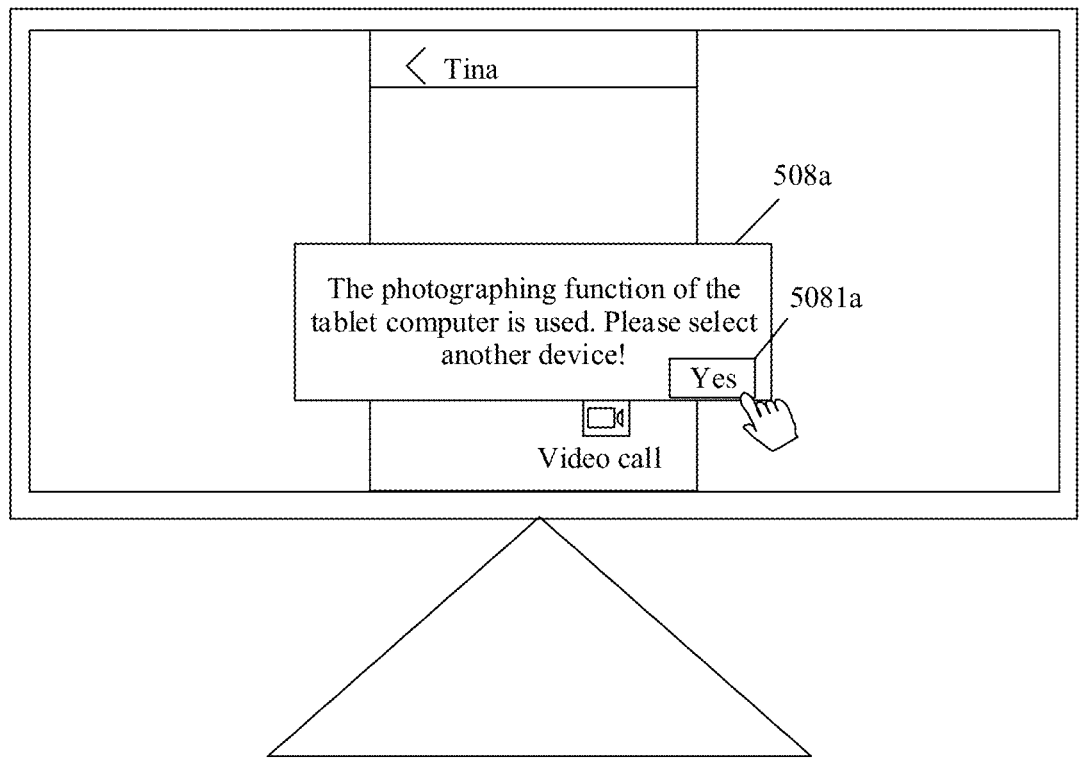

For example, as shown in FIG. 5G, the television 200 displays, in a prompt box 508a, prompt information "The photographing function of the tablet computer is used. Please select another device". The prompt box 508a further includes a "yes" control 5081a. It can be understood that after the user clicks the "yes" control 5081a, the television 200 closes the prompt box 508a, and the prompt box 508a disappears.

> Operation 418: The television 200 displays, to the user, the information that the camera is not used.

When determining that the received information about the usage status indicates that the camera of the tablet computer 300 is not used, the application 204 supporting video calling on the television 200 prompts the user that the camera of the tablet computer 300 is not used and can be used for video calling, and requests the user to instruct whether to go on with a video call.

Figure 5H:
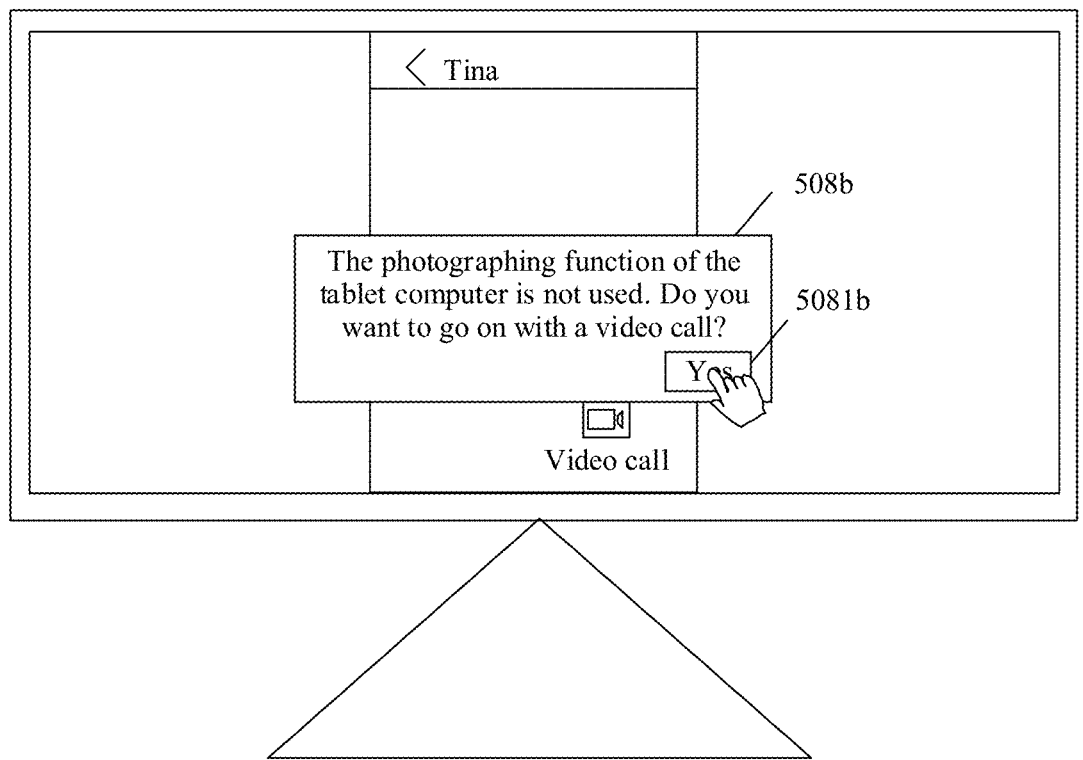

For example, as shown in FIG. 5H, the television 200 displays, in a prompt box 508b, prompt information "The photographing function of the tablet computer is not used. Do you want to go on with a video call?" The prompt box 508b further includes a "yes" control 5081b. It can be understood that, after the user clicks the "yes" control 5081b, the television 200 closes the prompt box 508, the prompt box 508 disappears, and the television 200 enters a phase in which a camera parameter is configured for the virtual camera module 202 of the tablet computer 300 and at the hardware abstraction layer of the television 200.

After the User Sees the Prompt Information as Shown in FIG. 5H, if the User Selects to go on with a Video Call, the Television 200 Needs to Configure a Camera Parameter for the Virtual Camera Module 202 of the Tablet Computer 300 and at the Hardware Abstraction Layer of the Television 200. The Phase in which the Camera Parameter is Configured for the Virtual Camera Module 202 of the Tablet Computer 300 and at the Hardware Abstraction Layer of the Television 200 is Described Below.

FIG. 4B-1 to FIG. 4B-4 are a schematic flowchart of configuring the camera parameter for the virtual camera module 202 of the tablet computer 300 and at the hardware abstraction layer of the television 200 according to an embodiment of this application. As shown in FIG. 4B-1 to FIG. 4B-4, the phase for camera parameter configuration includes the following operations.

Operation 419: The television 200 generates a camera enabling instruction when an operation of the user for enabling an external photographing device in the application 204 supporting video calling that is at the application layer is detected, where the camera enabling instruction is used to instruct to configure and enable the tablet computer 300, so that the tablet computer 300 starts to acquire video data.

For example, in FIG. 5H, if the user clicks the "yes" control 5081b, the television 200 determines that the operation of the user is a camera enabling operation. For another example, as shown in FIG. 5B, after a wireless communication connection is established between the television 200 and the tablet computer 300, the user clicks the "video call" control 5041 again, that is, to perform the camera enabling operation.

Operation 420: The application 204 supporting video calling that is at the application layer of the television 200 sends the camera enabling instruction to the virtual camera module 202 at the hardware abstraction layer.

The application 204 supporting video calling that is at the application layer of the television 200 triggers a port negotiation operation of the virtual camera module 202 at the hardware abstraction layer of the television 200 when the camera enabling instruction sent by the application 204 supporting video calling that is at the application layer of the television 200 is received. The port negotiation operation enables the television 200 and the camera to negotiate a channel that can transmit the camera enabling instruction.

Operation 421: The virtual camera module 202 at the hardware abstraction layer of the television 200 sends a port negotiation request to the tablet computer 300 by using the transceiver module 201 at the hardware abstraction layer, where the port negotiation request is used to indicate the television 200 and the tablet computer 300 to negotiate a port that can transmit the camera enabling instruction.

The port negotiation request is used for negotiation between the television 200 and the tablet computer 300 for transmitting the camera enabling instruction over a preset port. The preset port may be a control port. The preset port and a video data transmission port are not a same port, so that data, for example, a video transmitted by the tablet computer 300 to the television 200, and a control instruction, for example, a camera enabling request, are prevented from being transmitted through a same channel, and interference with a video data transmission speed and transmission quality is avoided.

It can be understood that, because the control port is configured to send the camera enabling request, and is for controlling the tablet computer 300, the port may also be referred to as a control channel.

Operation 422: The tablet computer 300 feeds back, to the transceiver module 201 at the hardware abstraction layer of the television 200, information that the camera enabling instruction can be sent over the preset port.

It can be understood that port negotiation refers to operations of such as, first, negotiating a device port number used for instruction/data transmission, and obtaining, at either end, an IP address of a peer end during specific instruction/data transmission.

For example, the tablet computer 300 sends, to the television 200, a port number for the camera enabling request for negotiation. The tablet computer 300 sends, to the transceiver module 201 of the television 200, information that the camera enabling request can be transmitted over the control port.

For example, the television 200 sends the camera enabling request to the tablet computer 300 through an interface A, and the tablet computer 300 receives, through an interface B, the camera enabling request sent by the television 200.

Figure 5I:
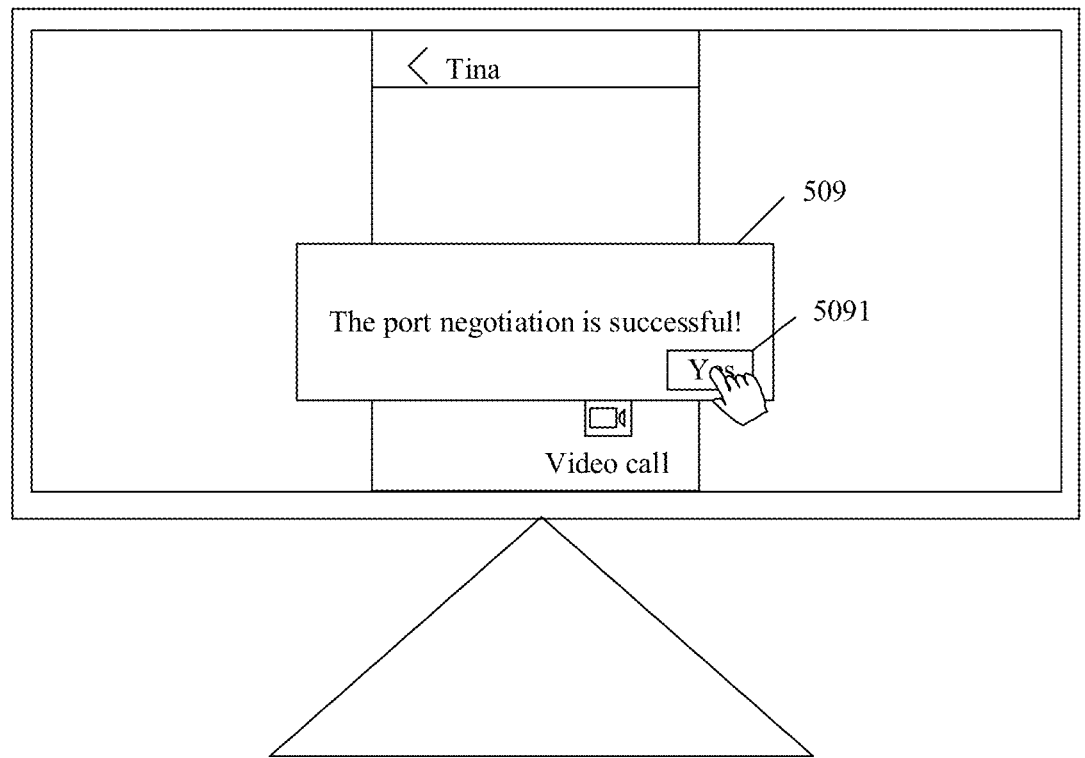

In some embodiments, after the negotiation succeeds, the tablet computer 300 sends information about a successful negotiation to the television 200. After receiving the information about the successful negotiation, the television 200 displays the information about the successful negotiation, so that the user can know about a process of configuring and enabling the tablet computer 300, thereby improving user experience. For example, as shown in FIG. 5I, the television 200 displays, in a prompt box 509, prompt information "The port negotiation is successful!" The prompt box 509 further includes a "yes" control 5091. It can be understood that, after the user clicks the "yes" control 5091, the television 200 closes the prompt box 509, and the prompt box 509 disappears.

Operation 423: The transceiver module 201 at the hardware abstraction layer of the television 200 sends the camera enabling instruction to the tablet computer 300 over the preset port.

It can be understood that, after the port negotiation succeeds, the television 200 may send the control command over a negotiated port, for example, may transmit the camera enabling instruction over the negotiated preset port.

It can be understood that the port negotiation may be port auto-negotiation. Specifically, a port auto-negotiation mode means that a port automatically adjusts a speed to a highest operating level based on a connection speed and duplex mode of a device at the other end, that is, a highest possible speed and duplex mode that can be provided at both ends of a link. An auto-negotiation function allows a network device to transmit information about an operating mode supported by the network device to a peer end in a network and receive corresponding information possibly sent back from the peer end. In this way, duplex and 10M/100M auto-negotiation problems are solved.

Operation 424: The tablet computer 300 enables the photographing function.

It can be understood that, video data transmission is not yet performed, and the tablet computer 300 only enables the photographing function, and the tablet computer 300 starts to acquire video data.

Operation 425: The television 200 sends a camera capability parameter query request and a request for information about a photographing function usage status to the tablet computer 300 by using the transceiver module 201 at the hardware abstraction layer.

It can be understood that the television 200 and the tablet computer 300 have different capabilities of processing video data and displaying a video. Therefore, the television 200 needs to obtain a camera capability parameter of the tablet computer 300, so that the television 200 adjusts a manner of processing video data and displaying a video. For example, the camera capability parameter may be a capability of the camera of encoding video data.

In addition, it can be understood that, the information about the camera usage status may indicate that the photographing function of the camera is not used, is being used, or is used. The tablet computer 300 may be used by another device at any time. In this case, information about camera usage may be queried again, to more accurately determine whether the photographing function of the camera can be used.

Operation 426: The tablet computer 300 feeds back the camera capability parameter and the information about the usage status to the virtual camera module 202 at the hardware abstraction layer by using the transceiver module 201 at the hardware abstraction layer of the television 200.

For example, if the tablet computer 300 finds a message, stored in the directory of the tablet computer 300, indicating that the camera is not used by another device, it is determined that the camera of the tablet computer 300 is not used by another device. The tablet computer 300 feeds back the information that the camera of the tablet computer 300 is not used by another device to the television 200. If the tablet computer 300 finds a message, stored in the directory of the tablet computer 300, indicating that the camera is used by another device, it is determined that the camera of the tablet computer 300 is used by another device. The tablet computer 300 feeds back the information that the camera of the tablet computer 300 is used by another device to the television 200.

For example, if the tablet computer 300 finds a drive file, stored in the directory of the tablet computer 300, indicating that the camera is capable of H.264 coding, it is determined that the camera of the tablet computer 300 is capable of H.264 coding. The tablet computer 300 feeds back to the television 200 that the camera of the tablet computer 300 is capable of H.264 coding.

When the television 200 receives the camera capability parameter and the usage information, the television 200 sends the camera capability parameter and the usage information to the virtual camera module 202 at the hardware abstraction layer by using the transceiver module 201 at the hardware abstraction layer, and the television 200 sends the camera capability parameter and the usage information to the application 204 supporting video calling that is at the application layer by using the virtual camera module 202 at the hardware abstraction layer.

Operation 427: The virtual camera module 202 at the hardware abstraction layer of the television 200 feeds back the information about the camera usage status to the application 204 supporting video calling that is at the application layer.

Operation 428: The application 204 supporting video calling that is at the application layer of the television 200 displays the information about the camera usage status.

Operation 429: The virtual camera module 202 at the hardware abstraction layer of the television 200 determines whether the information about the usage status of the tablet computer 300 indicates that the photographing function is not used.

It can be understood that the information about the camera usage status may indicate that the photographing function of the camera is not used or is being used. The tablet computer 300 can be used by the television 200 only when the tablet computer 300 is not used by another device. Therefore, the television 200 needs to invoke a program interface used for processing video data transmitted from an external camera, so that the television 200 can enable the video calling function. For example, if the virtual camera module 202 at the hardware abstraction layer of the television 200 determines that the information about the usage status of the tablet computer 300 indicates that the photographing function is not used, the virtual camera module 202 that is at the hardware abstraction layer of the television 200 and that is configured to process the video data transmitted from the external camera is invoked.

When the tablet computer 300 is used by another device, the tablet computer 300 cannot be used by the television 200. In this case, the program interface used for processing the video data transmitted from external camera does not need to be invoked. For example, if the virtual camera module 202 at the hardware abstraction layer of the television 200 determines that the information about the usage status of the tablet computer 300 indicates that the photographing function is used, the virtual camera module 202 that is at the hardware abstraction layer of the television 200 and that is configured to process the video data transmitted from the external camera is not invoked.

Operation 430: The television 200 invokes the virtual camera module 202 at the hardware abstraction layer, and configures the virtual camera module 202 based on a result parameter obtained by comparing the camera capability parameter with a capability parameter of the television 200.

For example, the television 200 may configure, based on a contrast ratio, the virtual camera module 202 to be capable of processing received video data into video data satisfying the contrast ratio. A specific configuration procedure is described below in detail.

The virtual camera module 202 is a program that has an image processing capability, and the image processing capability may include, but is not limited to, video data decoding, color adjustment, color space conversion, scaling, rotation, mirroring, filling, photographing, recording, and the like. In response to the camera enabling operation of the user in the application 204 supporting video calling, the television 200 generates the virtual camera module 202 through an operation interface at the hardware abstraction layer of an operating system on the television 200.

The virtual camera module 202 performs processing, for example, decoding, color space conversion, scaling, rotation, mirroring, and filling on an image or the video data based on the preset camera parameter. Specifically, the virtual camera module 202 includes a status management module 2021, an image processing module 2022, and an operation control module 2023. The status management module 2021 is configured to control a usage status of the tablet computer 300. The status management module 2021 is configured to: when the television 200 determines that a user enables the photographing function of the application 204 supporting video calling, enable the television 200 to have a capability of using the camera. The operation control module 2023 is configured to: open or close a video data obtaining channel, configure a format for video or image data, and process an instruction for requesting or disabling to obtain the video or image data at the framework layer. The image processing module 2022 is configured to perform processing, for example, decoding, color space conversion, scaling, rotation, mirroring, and filling on the video data based on the preset camera parameter.

In response to a user operation of disconnecting from the external tablet computer 300, the application 204 supporting video calling releases the virtual camera module 202 through the operation interface at the hardware abstraction layer of the operating system on the television 200.

It can be understood that the application supporting video calling is generally implemented by a Java program, and the hardware abstraction layer is implemented by a C/C++ program. In this case, the application supporting video calling may indirectly invoke an operation interface for a struct camera-device-ops-t at the hardware abstraction layer through a Java native interface (JNT), to complete an operation on the tablet computer 300. Conversion of an output format of the external tablet computer 300 is completed through an encapsulated image function interface by using software or a hardware codec on an Android host device, to obtain video data for photographing and video recording previewing.

Figure 4C:
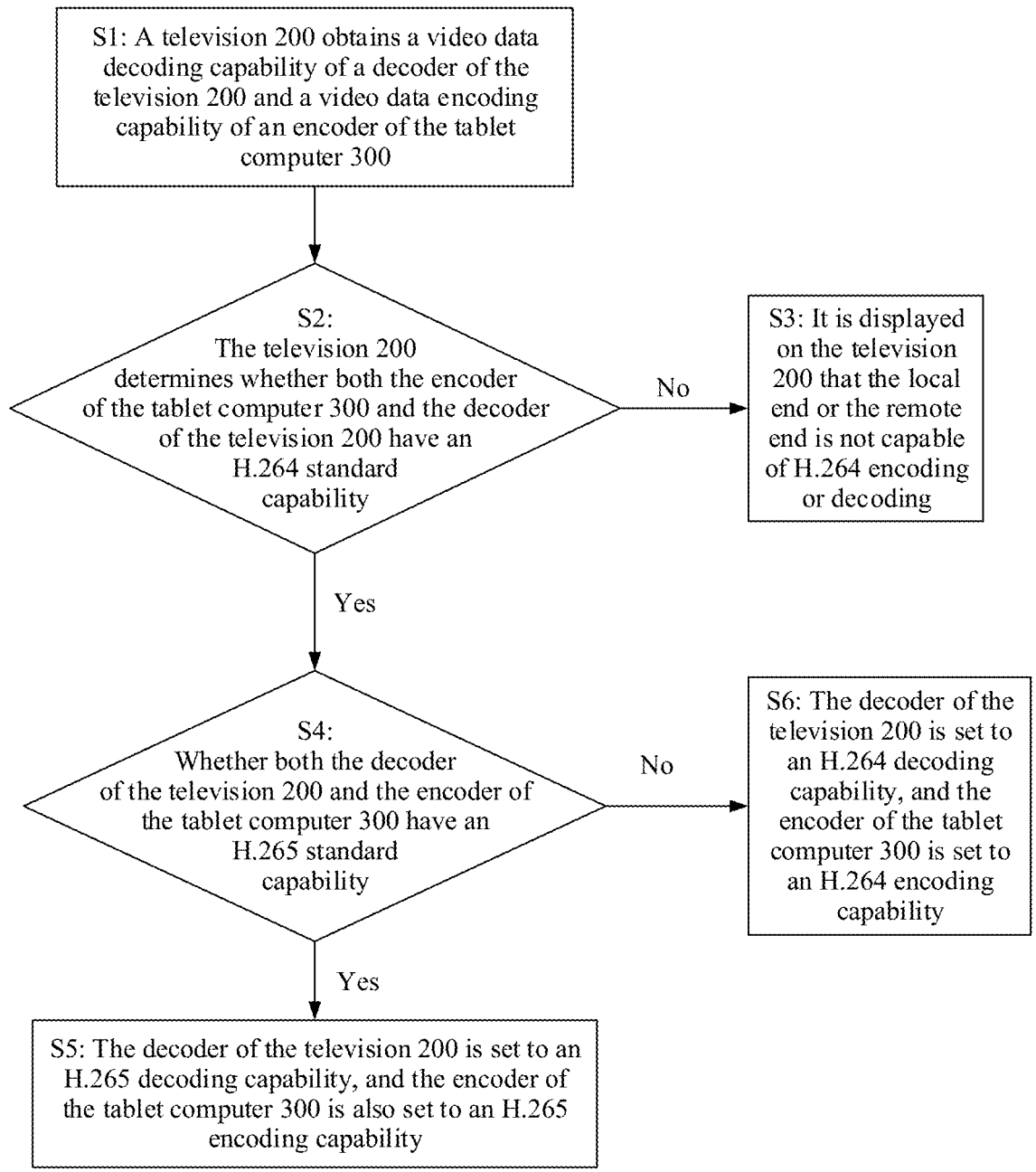
FIG. 4C is a schematic flowchart of configuring a virtual camera module 202 by a television 200 based on a result parameter obtained by comparing a camera capability parameter with a capability parameter of the television 200 according to some embodiments of this application.

It can be understood that the television 200 and the tablet computer 300 have different capabilities of processing video data and displaying a video. Therefore, the television 200 needs to obtain a camera capability parameter of the tablet computer 300, so that the television 200 adjusts a manner of processing video data and displaying a video. For example, the camera capability parameter may be a capability of the camera of encoding video data. The television 200 configures the virtual camera module 202 based on the result parameter obtained by comparing the camera capability parameter with the capability parameter of the television 200. FIG. 4C is a schematic flowchart of configuring the virtual camera module 202 by the television 200 based on the result parameter obtained by comparing the camera capability parameter with the capability parameter of the television 200 according to some embodiments of this application. Specifically, the following operations are included.

Operation S1: The television 200 obtains a video data encoding capability of an encoder of the tablet computer 300, and the television 200 further obtains a video data decoding capability of a decoder of the television 200.

Operation S2: The television 200 compares the video data encoding capability of the encoder of the tablet computer 300 with the video data decoding capability of the decoder of the television 200, and the television 200 determines whether both the encoder of the tablet computer 300 and the decoder of the television 200 have an H.264 standard capability, that is, determines whether the decoder of the television 200 is capable of H.264 decoding and whether the encoder of the tablet computer 300 is capable of H.264 encoding. If no, S3 is performed, or if yes, S4 is performed.

Operation S3: It is displayed on the television 200 that the television 200 is not capable of H.264 decoding or the tablet computer 300 is not capable of H.264 encoding.

Operation S4: The television 200 continues to determine whether both the decoder of the television 200 and the encoder of the tablet computer 300 have an H.265 standard capability, that is, the television 200 determines whether the decoder of the television 200 is capable of H.265 decoding and whether the encoder of the tablet computer 300 is capable of H.265 encoding. If yes, S5 is performed. If no, S6 is performed.

Operation S5: The decoder of the television 200 is set to an H.265 decoding capability, and the encoder of the tablet computer 300 is set to an H.265 encoding capability.

Operation S6: The decoder of the television 200 is set to an H.264 decoding capability, and the encoder of the tablet computer 300 is set to an H.264 encoding capability.

Figure 5J:
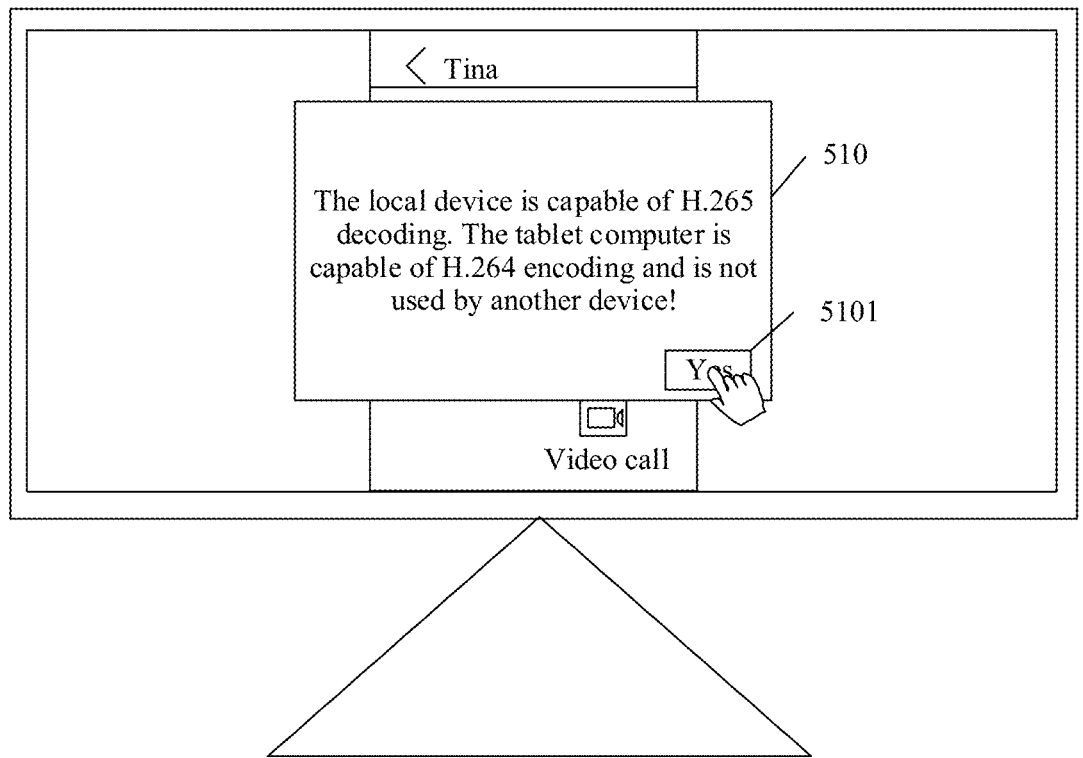

To let a user know about the process of configuring and enabling the tablet computer 300 and improve user experience, as shown in FIG. 5J, the television 200 may display, in a prompt box 510, prompt information "The local device is capable of H.265 decoding. The camera is capable of H.264 encoding and is not used by another device!" The prompt box 509 further includes a "yes" control 5101. It can be understood that, after the user clicks the "yes" control 5101, the television 200 closes the prompt box 510, and the prompt box 510 disappears.

Figure 5K:
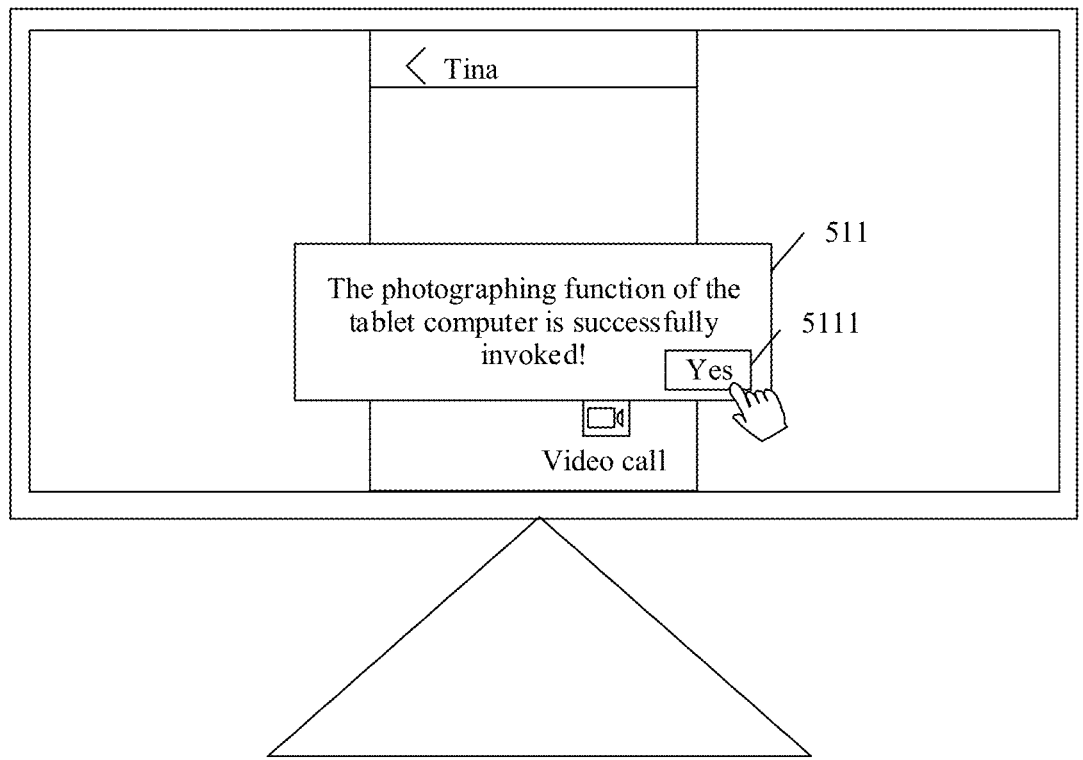

To prompt the user, after the television 200 invokes a virtual camera function of the hardware abstraction layer, as shown in FIG. 5K, the television 20 may display, in a prompt box 511, a prompt message "The photographing function of the tablet computer is successfully invoked!" The prompt box 511 further includes a "yes" control 5111. It can be understood that, after the user clicks the "yes" control 5111, the television 200 closes the prompt box 511, and the prompt box 511 disappears.

Operation 431: The virtual camera module 202 at the hardware abstraction layer of the television 200 sends a camera parameter obtaining request to CameraService 203 at the framework layer.

After the virtual camera module 202 at the hardware abstraction layer of the television 200 configures the virtual camera module 202 based on the result parameter obtained by comparing the camera capability parameter with the capability parameter of the television 200, the virtual camera module 202 at the hardware abstraction layer of the television 200 sends the camera parameter obtaining request to CameraService 203 at the framework layer. The camera parameter obtaining request is used to indicate the virtual camera module 202 at the hardware abstraction layer of the television 200 to obtain a camera parameter from CameraService 203 at the framework layer.

The camera parameter may include a camera parameter of a camera and a camera parameter of a television. The camera parameter of the camera is used for configuring a camera parameter of the tablet computer 300. The camera parameter of the television is used for configuring a camera parameter of the television 200. It can be understood that the camera parameter of the camera may be a resolution, a frame rate, light sensitivity (ISO value), a burst rate, a focus speed, time of exposure, a bit depth of an image, a pixel size, an exposure mode, a focus mode, or the like. The camera parameter of the television may be an image contrast ratio, an image resolution, or the like.

Figure 5L:
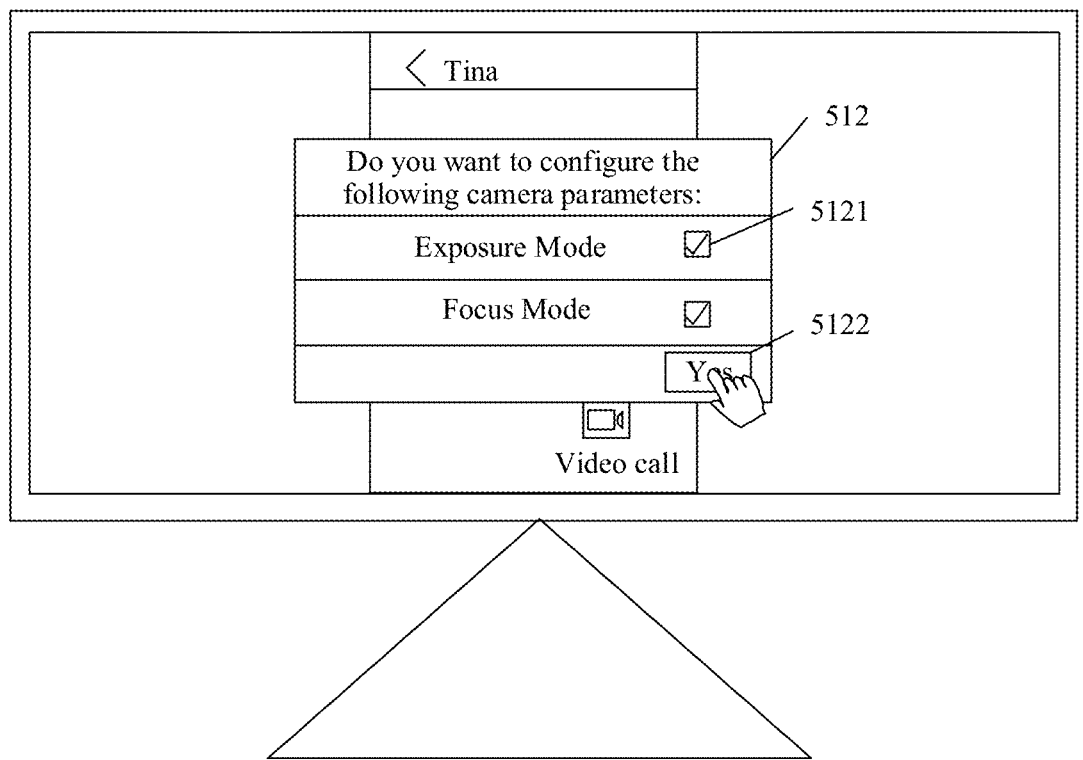

In some embodiments, the camera parameter may be set based on a user operation or set by the television. For description, if the camera parameter is set based on the user operation, the television 200 may determine, by using the application 204 supporting video calling that is at the application layer, the camera parameter selected based on the user operation. CameraService 203 at the framework layer of the television 200 sends the camera parameter to the virtual camera module 202 based on the camera parameter selected by a user. For example, as shown in FIG. 5L, the television 200 displays, in a prompt box 512, a prompt message "Do you want to configure the following camera parameters: Exposure Mode and Focus Mode". The prompt box 512 further includes a check-off control 5121 and a confirmation control 5122. The user may select at least one mode from the exposure mode and the focus mode. It is assumed that the user selects the exposure mode and the focus mode, and the check-off control 5121 and the confirmation control 5122 corresponding to the exposure mode and the focus mode are clicked. In this case, the television 200 determines that the camera parameter includes the exposure mode and the focus mode.

Operation 432: The television 200 sends the camera parameter to the virtual camera module 202 at the hardware abstraction layer by using CameraService 203 at the framework layer.

Operation 433: The virtual camera module 202 at the hardware abstraction layer of the television 200 configures the virtual camera module 202 based on the camera parameter.

After the television 200 configures the virtual camera module 202 based on the camera parameter of the television, the virtual camera module 202 may convert the video data received from the tablet computer 300 into a format specified based on the camera parameter of the television, for example, convert the video data received from the tablet computer 300 into video data with a preset contrast ratio.

Operation 434: The virtual camera module 202 at the hardware abstraction layer of the television 200 sends a port negotiation request to the tablet computer 300 by using the transceiver module 201 at the hardware abstraction layer, where the port negotiation request is used to indicate the television 200 and the tablet computer 300 to negotiate a preset port that can transmit the camera parameter.

The port negotiation request is used for negotiation between the television 200 and the tablet computer 300 for transmitting the camera parameter over the preset port. The preset port may be a parameter port. The preset port and a video data transmission port are not a same port, so that data, for example, a video transmitted by the tablet computer 300 to the television 200 and a control instruction, for example, the port negotiation request are prevented from being transmitted through a same channel, and interference with a video data transmission speed and transmission quality is avoided. It can be understood that the port may also be referred to as a control channel.

Operation 435: The tablet computer 300 feeds back, to the transceiver module 201 at the hardware abstraction layer of the television 200, that the camera parameter can be sent over the preset port.

After the tablet computer 300 feeds back that information about the camera parameter can be sent over the preset port, the television 200 may transmit the camera parameter over the negotiated preset port.

Operation 436: The transceiver module 201 at the hardware abstraction layer of the television 200 sends the camera parameter to the tablet computer 300 over the preset port.

Operation 437: The tablet computer 300 configures the tablet computer 300 based on the camera parameter.

The tablet computer 300 may configure the tablet computer 300 based on the camera parameter of the camera sent by the television 200. In this way, the tablet computer 300 obtains data that satisfies the camera parameter by adjusting a camera parameter (for example, a burst rate, a focus speed, and time of exposure) during photographing and processing the video data (compressing the video data to a preset size).

Operation 438: The tablet computer 300 feeds back, by using the transceiver module 201 at the hardware abstraction layer, information about a successful camera parameter configuration on the tablet computer 300 to the application 204 supporting video calling that is at the application layer of the television 200.

It can be understood that the tablet computer 300 may feed back the information about the successful camera parameter configuration to the transceiver module 201. Then, the transceiver module 201 at the hardware abstraction layer of the television 200 is used to send the information about the successful camera parameter configuration to the application 204 supporting video calling that is at the application layer of the television 200.

Alternatively, the tablet computer 300 may directly send the information about the successful camera parameter configuration to the application 204 supporting video calling that is at the application layer.

Operation 439: The application 204 supporting video calling that is at the application layer of the television 200 displays the information about the successful camera parameter configuration on the tablet computer 300.

Figure 5M:
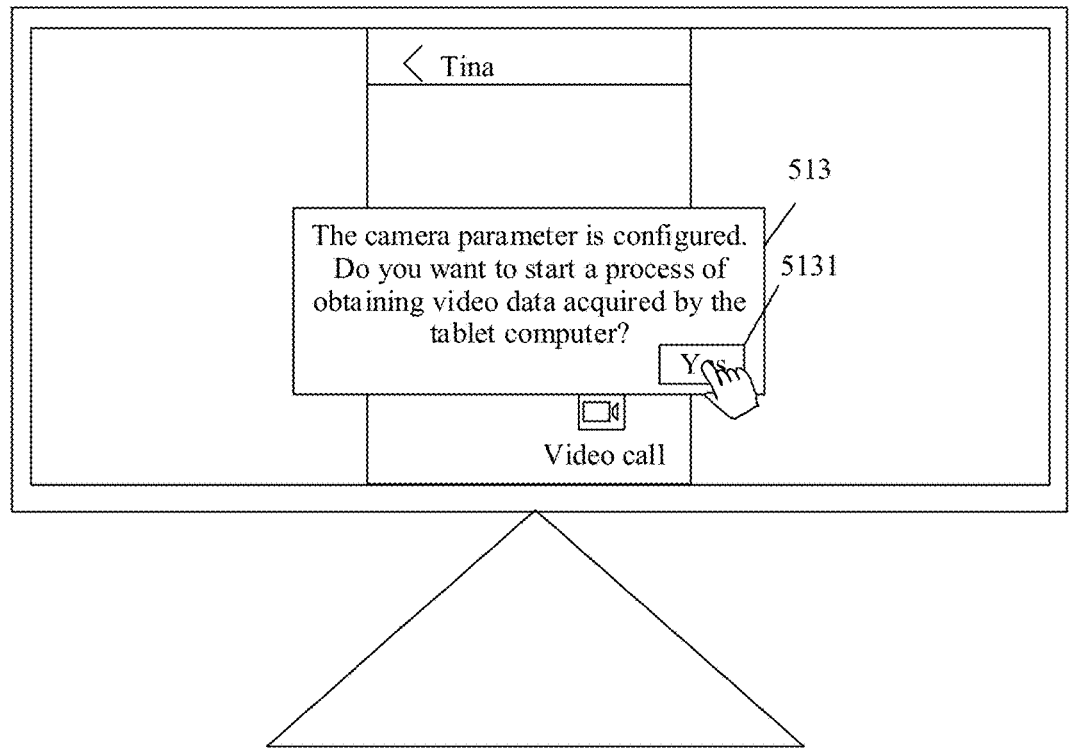

As shown in FIG. 5M, the television 200 displays, in a prompt box 513, prompt information "The camera parameter is configured. Do you want to start a process of obtaining video data acquired by the tablet computer?" The prompt box 513 further includes a "yes" control 5131. It can be understood that, after the user clicks the "yes" control 5131, the television 200 closes the prompt box 513, and the prompt box 513 disappears.

After the camera parameter configuration succeeds, for example, after a user sees the prompt information as shown in FIG. 5M, if the user selects to go on with a video call, the television 300 enters a phase in which the video data of the tablet computer 300 is obtained. In some other embodiments, after the television 200 establishes a wireless communication connection to the tablet computer 300, the television 200 automatically completes the phase in which the camera parameter is configured for the virtual camera module 202 of the tablet computer 300 and at the hardware abstraction layer of the television 200 without user perception. In this way, the user may control the television 200 to enter the phase in which the television 200 obtains the video data of the tablet computer 300.

A video data transmission process in the phase in which the television 200 obtains the video data of the tablet computer 300 is described below. Details are provided below.

Figures 1, 4D:
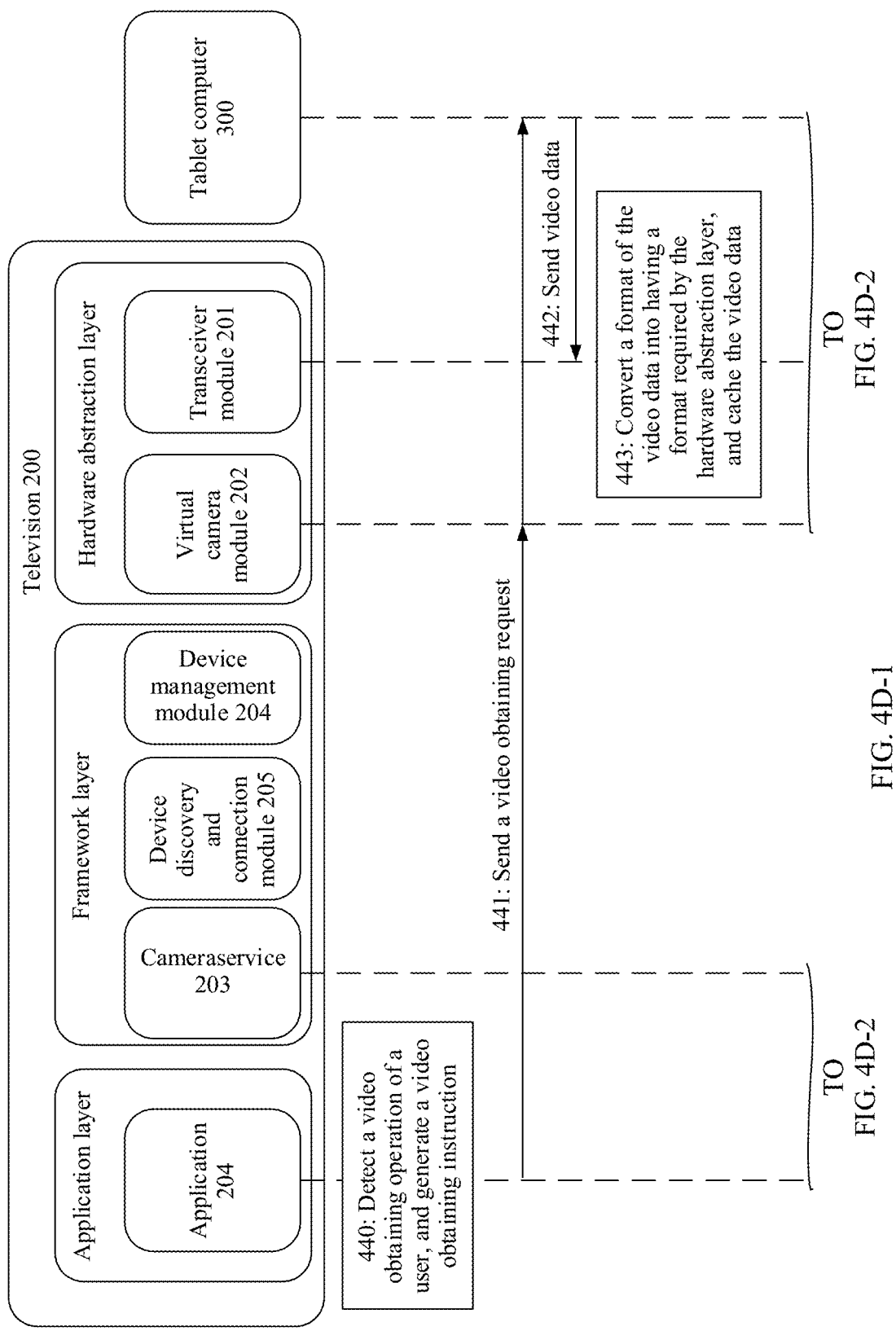
Figure 4D:
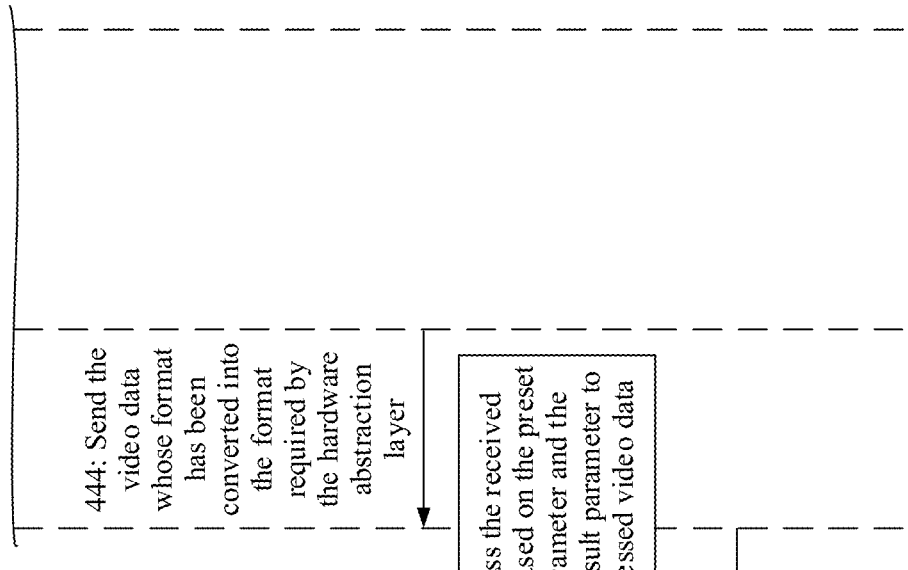
Figure 2:
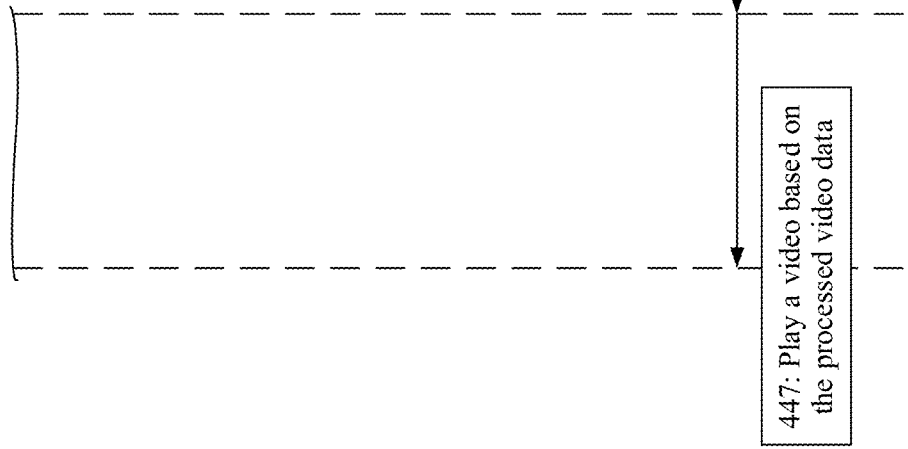
FIG. 2 is a diagram of an application scenario in which an electronic device implements video calling by using an external device according to some embodiments of this application.

FIG. 4D-1 and FIG. 4D-2 are a schematic flowchart of video data transmission according to an embodiment of this application. As shown in FIG. 4D-1 and FIG. 4D-2:

Operation 440: The television 200 detects a video obtaining operation of a user, and generates a video obtaining instruction 440. The video obtaining instruction is used to obtain the video data from the tablet computer 300.

The television 200 may determine, based on a user operation in the application 204 supporting video calling that is at the application layer, whether the user operation is the video obtaining operation. For example, as shown in FIG. 5B, after the television 200 establishes a communication connection to the tablet computer 300, if the user clicks the "video call" control 5041 again, the television 200 may determine that an operation of the user of clicking the "video call" control 5041 is the video obtaining operation. In addition, it can be understood that the video obtaining operation may alternatively be, but is not limited to, double-clicking or long-pressing the "video call" control.

In addition, it can be understood that, besides a video, the operation may alternatively be an image obtaining operation.

Operation 441: The application 204 supporting video calling that is at the application layer of the television 200 sends a video obtaining request to the tablet computer 300 by using the virtual camera module 202 at the hardware abstraction layer. The video obtaining request is used for obtaining the video data from the tablet computer 300.

To start a video data transmission procedure on the tablet computer 300, the video obtaining request needs to be sent to the tablet computer 300.

Data, for example, a video transmitted by the tablet computer 300 to the television 200 and a control instruction, for example, the video obtaining request are prevented from being transmitted through a same channel, and interference with a video data transmission speed and transmission quality is avoided. Before the virtual camera module 202 sends the video obtaining request to the tablet computer 300, the television 200 and the tablet computer 300 negotiate a data transmission port used to transmit the video data. The transmission port may also be referred to as a data transmission channel.

Operation 442: The tablet computer 300 sends the video data to the transceiver module 201 at the hardware abstraction layer.

The tablet computer 300 sends captured video data to the transceiver module 201 at the hardware abstraction layer.

Operation 443: The transceiver module 201 at the hardware abstraction layer of the television 200 converts the video data into a format required by the hardware abstraction layer, and caches the video data that has been converted into the format required by the hardware abstraction layer.

Generally, if the format required by the hardware abstraction layer is different from a format of the video data received by the transceiver module 201, the video data needs to be converted into the format required by the hardware abstraction layer. The format required by the hardware abstraction layer may be a PCM format.

It can be understood that, to slow down an excessively high receiving rate of the transceiver module 201, a received video cannot be displayed on the television 200 in real time, or the transceiver module 20 may cache the video data that has been converted into the format required by the hardware abstraction layer for subsequent use on the television 200.

Operation 444: The transceiver module 201 at the hardware abstraction layer of the television 200 sends, to the virtual camera module 202, the video data that has been converted into the format required by the hardware abstraction layer.

Operation 445: The virtual camera module 202 at the hardware abstraction layer of the television 200 processes the received video data based on the preset camera parameter and the capability result parameter, to obtain processed video data.

The virtual camera module 202 is configured to: manage the process of obtaining the video data, and process the video data based on the preset camera parameter. Specifically, the virtual camera module 202 includes an image processing module 2022. The image processing module 2022 is configured to perform processing, for example, decoding, color space conversion, scaling, rotation, mirroring, and filling on the video data based on the preset camera parameter. For example, the video data is decoded into an H.265 format.

Operation 446: The television 200 sends the processed video data to the application 204 supporting video calling that is at the application layer by using CameraService 203 at the hardware abstraction layer.

Operation 447: The application 204 supporting video calling that is at the application layer of the television 200 plays a video based on the processed video data.

Embodiment 2

Figure 6:
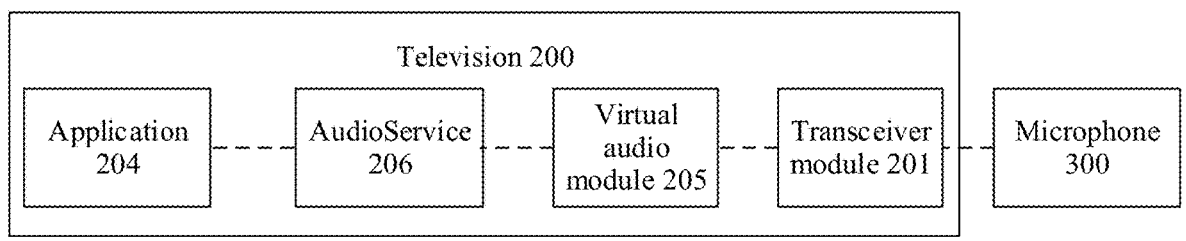
FIG. 6 is a diagram of an architecture of a system for audio data transmission between a microphone 300 and a television 200.

FIG. 6 is a diagram of an architecture of a system for audio data transmission between a microphone 300 and a television 200. Compared with the architectural diagram in the application scenario shown in FIG. 3A in Embodiment 1, the virtual camera module may be replaced with a virtual audio module 205 configured to connect to a device that has a sound pickup function (for example, a microphone). Three phases in which the television 200 establishes a wireless communication connection to the microphone 300 and performs information query on the microphone 300, an audio parameter is configured for the microphone 300 and the virtual audio module 205 at a hardware abstraction layer of the television 200, and the television 200 obtains audio data of the microphone 300 are based on the same technical concept as that in Embodiment 1. The first two phases are not described herein again. A technology used in the phase in which the television 200 obtains the audio data of the microphone 300 is described below in detail.

Figure 7A:
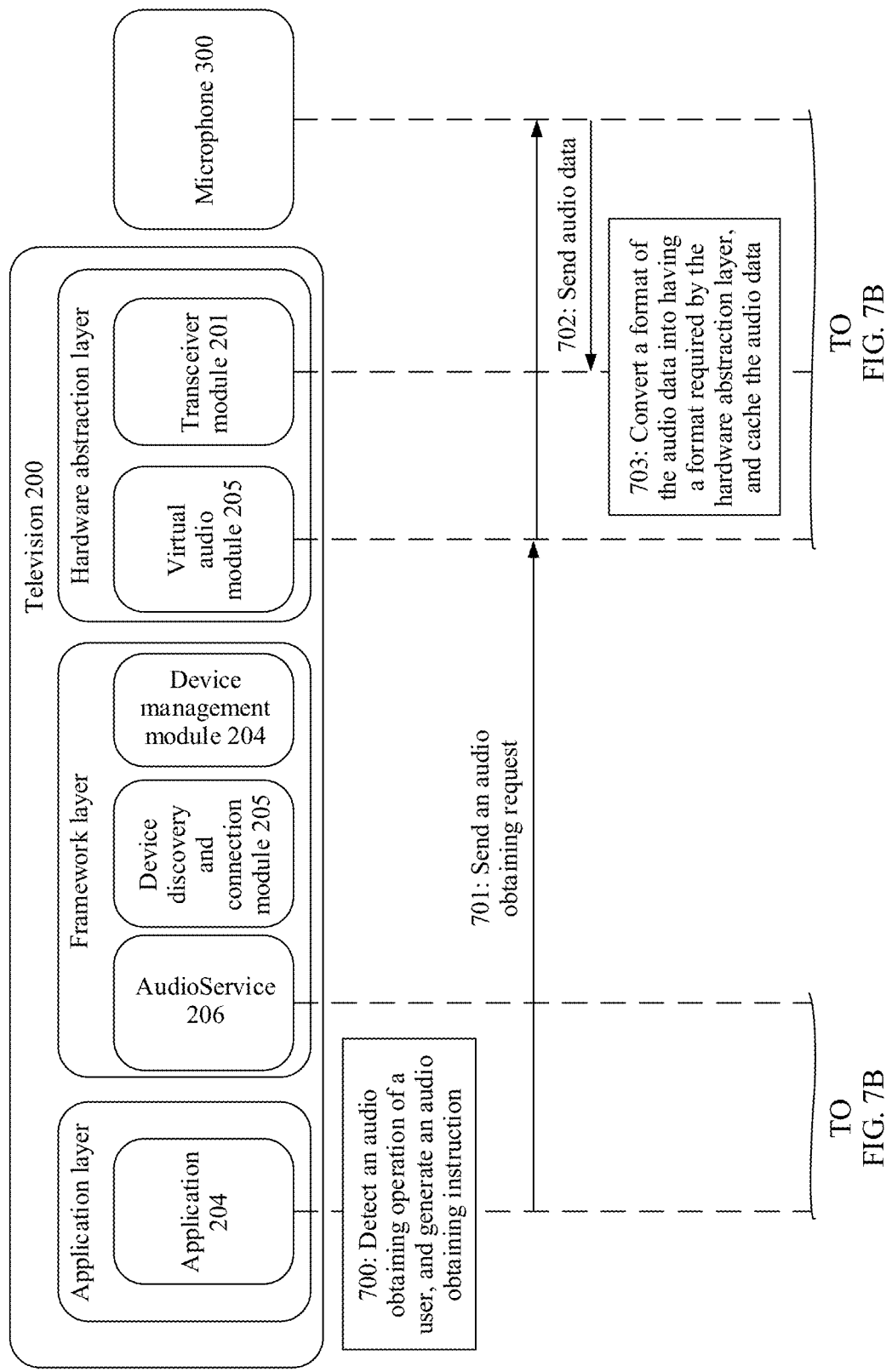
FIG. 7A and FIG. 7B are a schematic flowchart of audio data transmission according to an embodiment of this application.
Figure 7B:
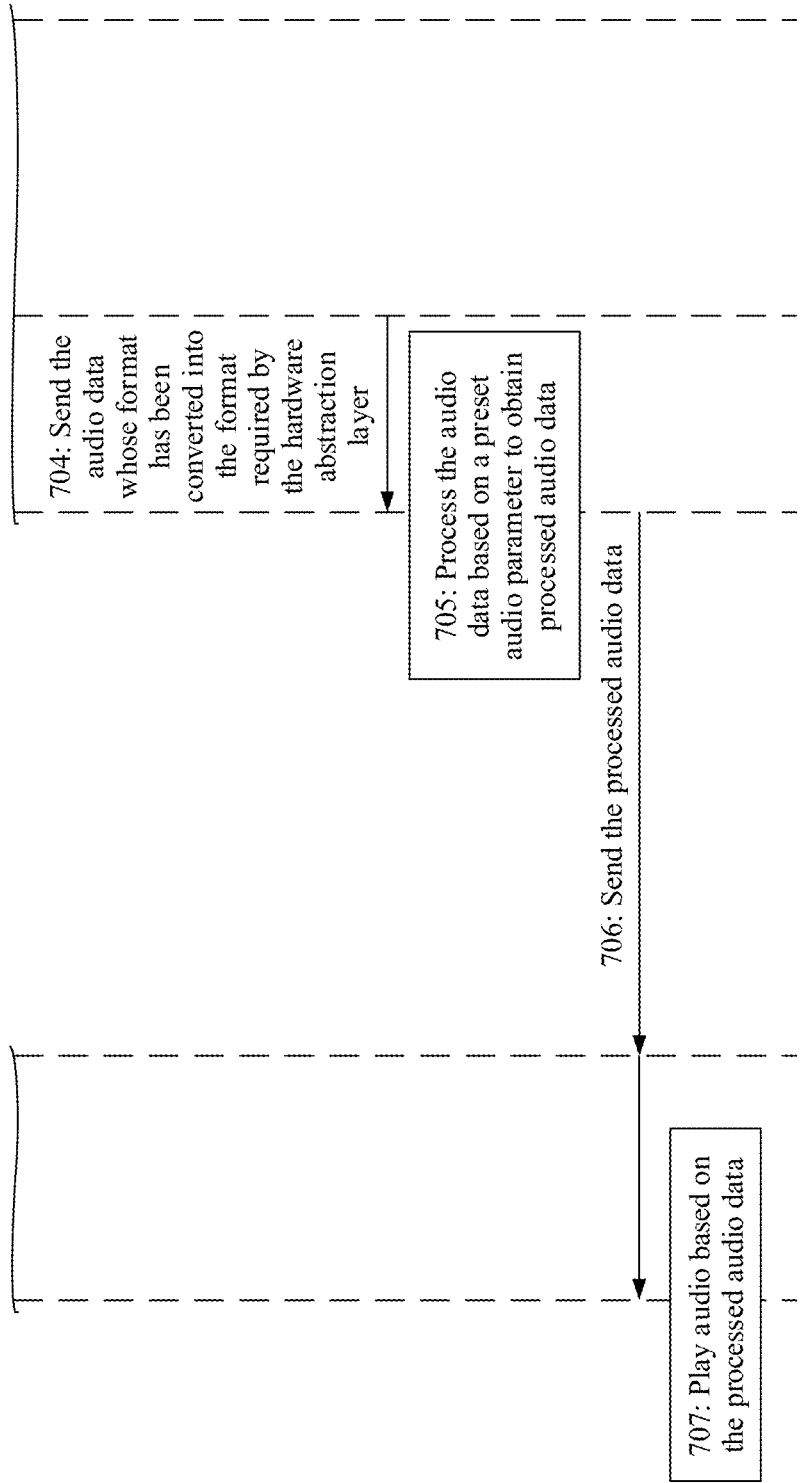

FIG. 7A and FIG. 7B are a schematic flowchart of audio data transmission according to an embodiment of this application. As shown in FIG. 7A and FIG. 7B:

Operation 700: The television 200 detects an audio obtaining operation of a user, and generates an audio obtaining instruction. The audio obtaining instruction is used to obtain the audio data from the microphone 300.

The television 200 may determine, based on a user operation in an application 204 supporting video calling that is at an application layer, whether the user operation is the audio obtaining operation. For example, after the television 200 establishes a communication connection to the microphone 300, if a user clicks an "audio call" control again, the television 200 may determine that an operation of the user of clicking the "audio call" control is the audio obtaining operation. In addition, it can be understood that the audio obtaining operation may alternatively be, but is not limited to, double-clicking or long-pressing the "audio call" control.

Operation 701: The application 204 supporting video calling that is at the application layer of the television 200 sends an audio obtaining request to the microphone 300 by using the virtual audio module 205 at the hardware abstraction layer. The audio obtaining request is used for obtaining the audio data from the microphone 300.

To start an audio data transmission procedure on the microphone 300, the audio obtaining request needs to be sent to the microphone 300.

Data, for example, audio transmitted by the microphone 300 to the television 200 and a control instruction, for example, the audio obtaining request are prevented from being transmitted through a same channel, and interference with an audio data transmission speed and transmission quality is avoided. Before the virtual audio module 205 sends the audio obtaining request to the microphone 300, the television 200 and the microphone 300 negotiate a data transmission port used to transmit the audio data. The transmission port may also be referred to as a data transmission channel.

Operation 702: The microphone 300 sends the audio data to a transceiver module 201 at the hardware abstraction layer.

The microphone 300 sends audio data obtained by sound pickup to the transceiver module 201 at the hardware abstraction layer.

Operation 703: The transceiver module 201 at the hardware abstraction layer of the television 200 converts the audio data into a format required by the hardware abstraction layer, and caches the audio data that has been converted into the format required by the hardware abstraction layer.

Generally, if the format required by the hardware abstraction layer is different from a format of the audio data received by the transceiver module 201, the audio data needs to be converted into the format required by the hardware abstraction layer. The format required by the hardware abstraction layer may be PCM. For example, if the format of the audio data received by the transceiver module 201 is AAC, the transceiver module 201 needs to decode AAC into the PCM format required by the hardware abstraction layer.

It can be understood that, to slow down an excessively high receiving rate of the transceiver module 201, received audio cannot be displayed on the television 200 in real time, or the transceiver module 20 may cache the audio data that has been converted into the format required by the hardware abstraction layer for subsequent use on the television 200.

Operation 704: The transceiver module 201 at the hardware abstraction layer of the television 200 sends, to the virtual audio module 205, the audio data that has been converted into the format required by the hardware abstraction layer.

Operation 705: The virtual audio module 205 at the hardware abstraction layer of the television 200 processes the received audio data based on a preset audio parameter, to obtain processed audio data.

The virtual audio module 205 is configured to: manage the process of obtaining the audio data, and process the audio data based on the preset camera parameter.

Operation 706: The television 200 sends the processed audio data to the application 204 supporting video calling that is at the application layer by using the virtual audio module 205 at the hardware abstraction layer.

Operation 707: The application 204 supporting video calling that is at the application layer of the television 200 plays audio based on the processed audio data.

Embodiment 3

Figure 8:
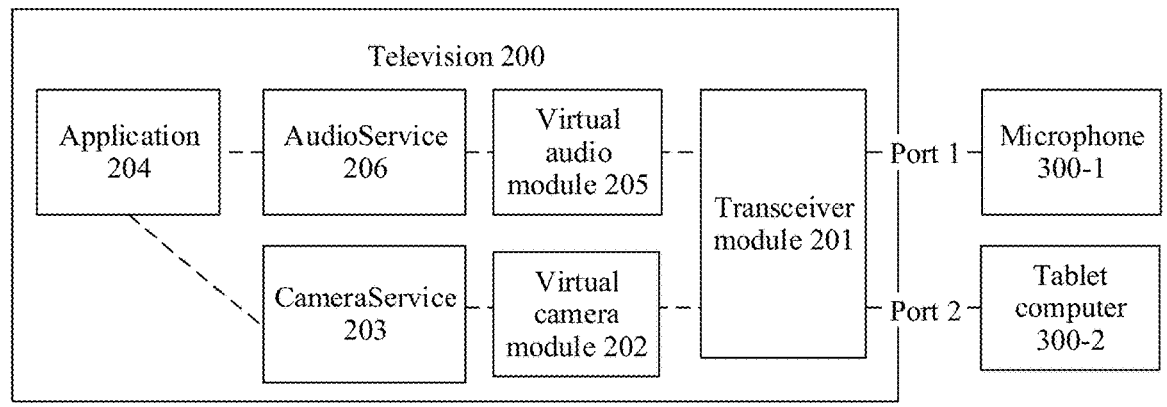
FIG. 8 is a diagram of an architecture of a system for audio data and video data transmission between a television 200 and a microphone 300-1, and a tablet computer 300-2.

FIG. 8 is a diagram of an architecture of a system for audio data and video data transmission between a television 200 and a microphone 300-1, and a tablet computer 300-2. As shown in FIG. 8, different from Embodiment 1, in this embodiment of this application, a virtual audio module 205 and a virtual camera module 202 are both disposed, and the virtual audio module 205 and the virtual camera module 202 are apposed to each other, to extend a photographing function and a sound pickup function. Different ports (that may also be referred to as channels) may be used for data transmission between the television 200 and the microphone 300-1, and the tablet computer 300-2, without interfering with each other. For example, a port 1 may be used for audio data transmission between the television 200 and the microphone 300-1, and a port 2 may be used for video data transmission between the television 200 and the tablet computer 300-2. Embodiment 3 and Embodiment 1 are based on a same technical concept. Details are not described herein again.

Embodiment 4

Figure 9:
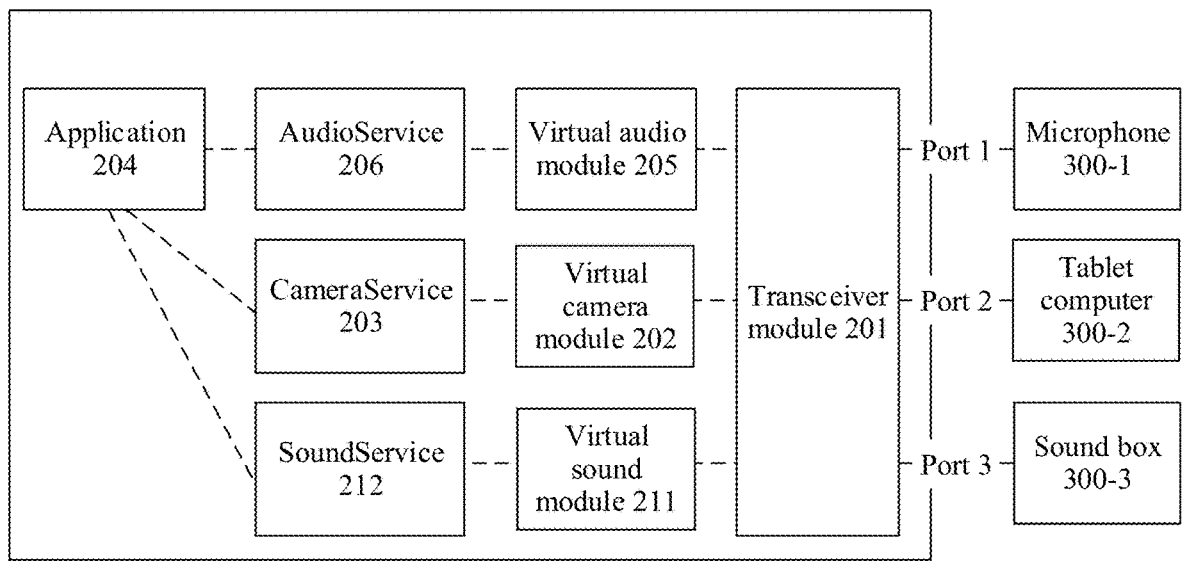
FIG. 9 is a diagram of an architecture of a system for audio data, video data, and audio data transmission between a television 200 and a microphone 300-1, a tablet computer 300-2, and a sound box 300-3.

FIG. 9 is a diagram of an architecture of a system for audio data, video data, and audio data transmission between a television 200 and a microphone 300-1, a tablet computer 300-2, and a sound box 300-3. As shown in FIG. 9, different from Embodiment 1, in this embodiment of this application, a virtual audio module 205, a virtual camera module 202, and a virtual sound module 211 are all disposed, and the virtual audio module 205, the virtual camera module 202, and the virtual sound module 211 are apposed to each other, to extend a photographing function, a sound pickup function, and a sound play function.

Different ports (that may also be referred to as channels) may be used for data transmission between the television 200 and the microphone 300-1, the tablet computer 300-2, and the sound box 300-3, without interfering with each other. For example, a port 1 may be used for audio data transmission between the television 200 and the microphone 300-1, a port 2 may be used for video data transmission between the television 200 and the tablet computer 300-2, and a port 3 may be used for video data transmission between the television 200 and the sound box 300-3. It can be understood that audio data on the television 200 that needs to be played by using the sound box 300-3 may be sourced from audio data that can be played and that is transmitted from a mobile phone 100 that has a video call with the television 200, or may be audio data that can be played and that is stored in a music application.

In this technical solution, an external electronic device includes, but is not limited to, a camera system (for example, the tablet computer 300-2), and may further include an external microphone system (for example, the microphone 300-1) and a sound box system (for example, the sound box 300-3). When a user makes a video call by using the television 200, video is previewed by using the camera system, voice is played by using the sound box system, and voice is acquired by using the microphone system. Embodiment 4 and Embodiment 1 are based on a same technical concept. Details are not described herein again.

Figure 10:
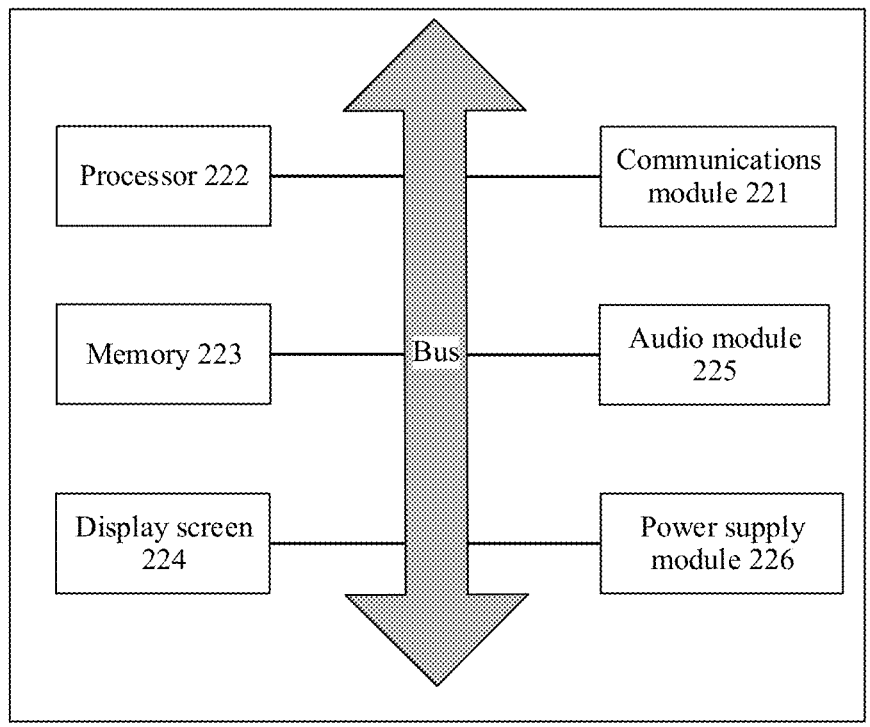
FIG. 10 is a schematic diagram of a structure of a television 200 applicable to an embodiment of this application.

FIG. 10 is a schematic diagram of a structure of a television 200 applicable to an embodiment of this application.

FIG. 10 is a schematic diagram of the structure of the television 200 disclosed according to an embodiment of this application. The television 200 may include a communications module 221, a processor 222, a memory 223, a display screen 224, an audio module 225, a power supply module 226, and the like.

It can be understood that the structure shown in this embodiment of the present invention does not constitute a specific limitation on the television 200. In some other embodiments of this application, the television 200 may include more or fewer components than those shown in the figure, combine some components, split some components, or have different component arrangements. The components shown in the figure may be implemented by hardware, software, or a combination of software and hardware.

The communications module 221 may include an antenna, and transmit and receive an electromagnetic wave through the antenna. The wireless communications module 221 may provide a wireless communications solution that is applied to the television 200 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, 2G/3G/4G/5G, and a subsequent wireless standard protocol. The television 200 may communicate with a network and another device by using a wireless communications technology. In this embodiment of this application, the communications module 221 may be used for communication with an external tablet computer 300 and receiving video data transmitted from the tablet computer 300.

The processor 222 may include one or more processing units, for example, may include a processing module or processing circuit, for example, a CPU, an ISP, a graphics processing unit (GPU), a DSP, a micro-programmed control unit (MCU), an artificial intelligence (AI) processor, or a field programmable gate array (FPGA). Different processing units may be independent components, or may be integrated into one or more processors. A storage unit may be disposed in the processor 222, and is configured to store an instruction and data. The processor 222 may perform the data transmission method in embodiments of this application.

The memory 223 is configured to store an instruction and data, and may store video data, audio data, an application, an operating system, and the like in this embodiment of this application.

The display screen 224 is configured to display a human-machine interaction interface, an image, a video, or the like. The display screen 224 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In this embodiment of this application, the television 200 may play a video based on the video data obtained from the external tablet computer 300.

The audio module 225 is configured to: convert digital audio information into an analog audio signal for output, or convert an analog audio input into a digital audio signal. The audio module 225 may be further configured to encode and decode an audio signal. In some embodiments, the audio module 225 may be disposed in the processor 222, or a part of functional modules of the audio module 225 are disposed in the processor 222. In some embodiments, the audio module 225 may include a loudspeaker, an earpiece, a microphone, and a headset jack.

The power supply module 226 may include a power supply, a power management component, and the like. The power supply may be a battery. The power management component is configured to manage charging of the power supply and power supply of the power supply to another module. In some embodiments, the power management component includes a charging management module and a power management module. The charging management module is configured to receive charging input from a charger. The power supply management module is configured to connect the power supply, the charging management module, and the processor 222. The power management module receives input of the power supply and/or the charging management module, and supplies power to the processor 222, the display screen 224, the communications module 221, and the like.

Figure 11:
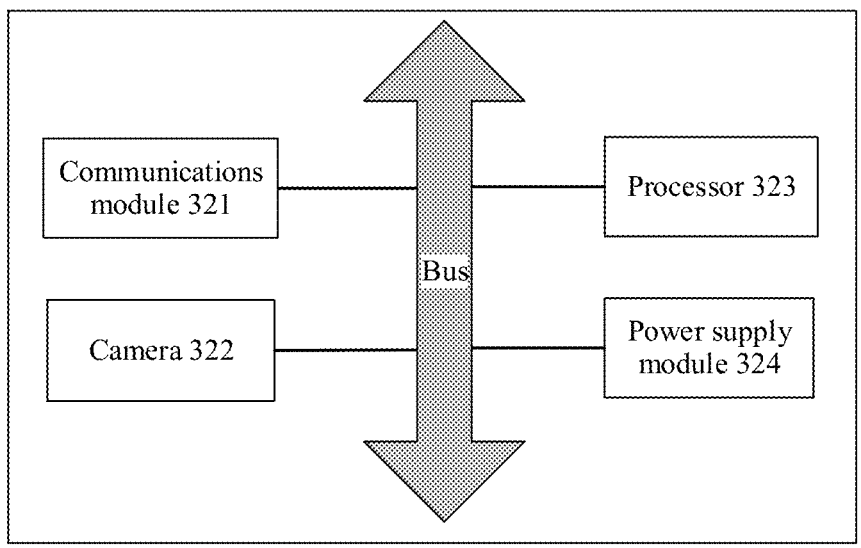
FIG. 11 is a schematic diagram of a structure of a tablet computer 300 applicable to an embodiment of this application.

FIG. 11 is a schematic diagram of a structure of a tablet computer 300 applicable to an embodiment of this application.

FIG. 11 is a schematic diagram of the structure of the tablet computer 300 disclosed according to an embodiment of this application. The tablet computer 300 may include a communications module 321, a camera 322, a processor 323, a power supply module 324, and the like.

It can be understood that the structure shown in this embodiment of the present invention does not constitute a specific limitation on the electronic device 100. In some other embodiments of this application, the tablet computer 300 may include more or fewer components than those shown in the figure, combine some components, split some components, or have different component arrangements. The components shown in the figure may be implemented by hardware, software, or a combination of software and hardware.

The communications module 321 may include an antenna, and transmit and receive an electromagnetic wave through the antenna. The wireless communications module 321 may provide a wireless communications solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, 2G/3G/4G/5G, and a subsequent wireless standard protocol. The electronic device 100 may communicate with a network and another device by using a wireless communications technology. In this embodiment of this application, the communications module 321 may be used for communication with a television 200 and transmitting captured video data to the television 200.

The processor 323 may include one or more processing units, for example, may include a processing module or processing circuit, for example, a CPU, an image signal processor (ISP), a graphics processing unit (GPU), a DSP, a micro-programmed control unit (MCU), an artificial intelligence (AI) processor, or a field programmable gate array (FPGA). Different processing units may be independent components, or may be integrated into one or more processors. A storage unit may be disposed in the processor 322, and is configured to store an instruction and data. In this embodiment of this application, the processor 322 may process a captured video to obtain video data, and send, when receiving an image data obtaining request sent by the television 200, the video data to the television 200.

The camera 332 is configured to capture a static image or a video. An optical image of a scene is generated through a lens, and is projected onto a photosensitive element. The photosensitive element converts an optical signal into an electrical signal, and then transmits the electrical signal to the ISP for converting the electrical signal into a digital image signal. The tablet computer 300 may implement a photographing function by using the ISP, the camera, a video codec, the GPU, a display screen 202, an application processor, and the like.

The power supply module 324 may include a power supply, a power management component, and the like. The power supply may be a battery. The power management component is configured to manage charging of the power supply and power supply of the power supply to another module. In some embodiments, the power management component includes a charging management module and a power management module. The charging management module is configured to receive charging input from a charger. The power supply management module is configured to connect the power supply, the charging management module, and the processor 322. The power management module receives input of the power supply and/or the charging management module, and supplies power to the processor 323, the camera 322, the communications module 321, and the like.

Figure 12:
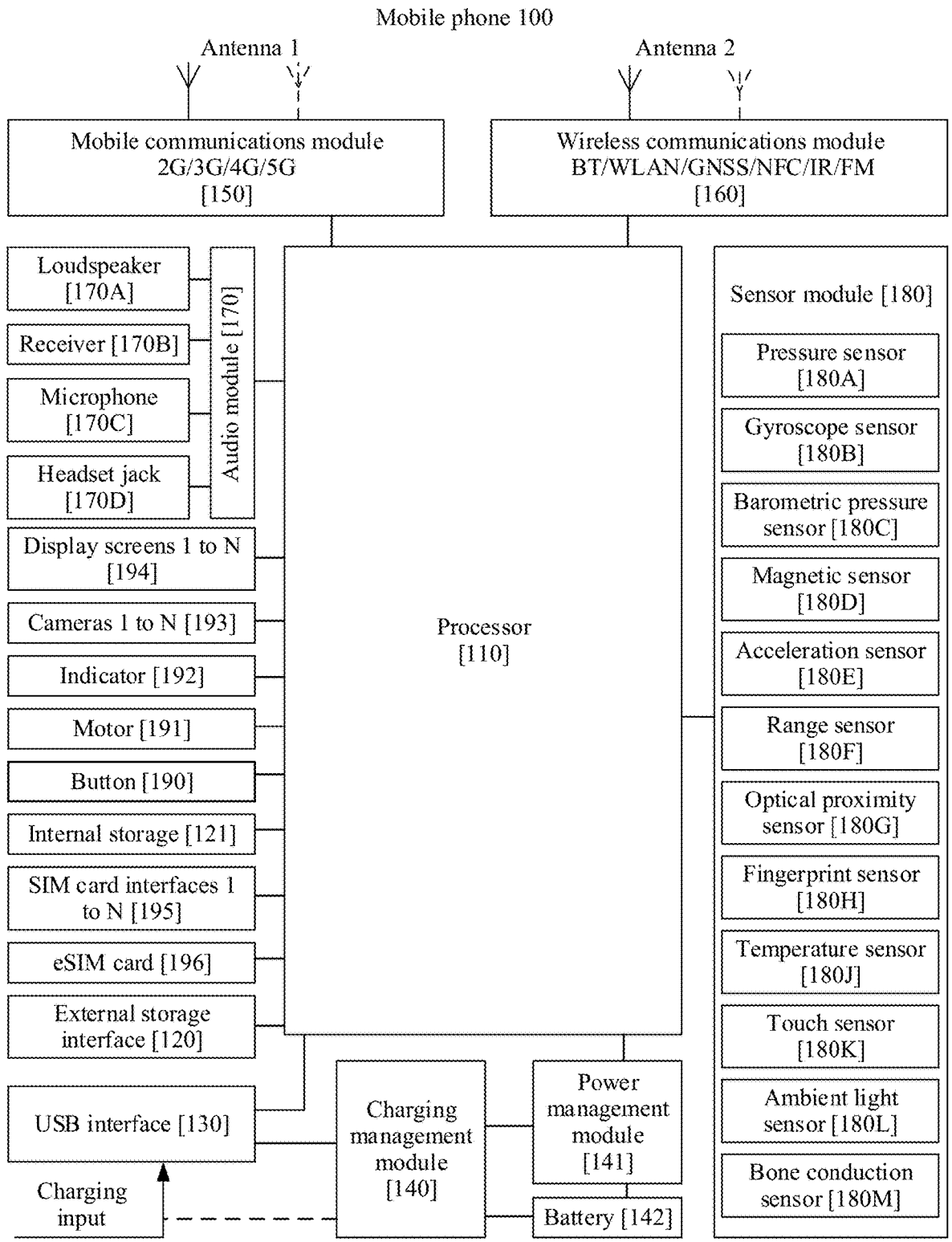
FIG. 12 is a schematic diagram of a structure of a mobile phone 100 applicable to an embodiment of this application.

FIG. 12 is a schematic diagram of a structure of a mobile phone 100 applicable to an embodiment of this application.

As shown in FIG. 12, the mobile phone 100 may include a processor 110, an external storage interface 120, an internal storage 121, a universal serial bus (USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identity module (SIM) card interface 195, an eSIM card 196, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the mobile phone 100. In some other embodiments of this application, the mobile phone 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or the data again, the processor may directly invoke the instruction or the data from the memory. This avoids repeated access, reduces a time for waiting of the processor 110, and improves system efficiency.

A wireless communications function of the mobile phone 100 may be implemented by using the antenna 1, the antenna 2, the mobile communications module 150, the wireless communications module 160, the modem processor, the baseband processor, and the like. In this embodiment of this application, these modules may be used for interaction with the television 200 and obtaining video data from the television 200.

The mobile phone 100 may implement a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs that execute a program instruction to generate or change display information.

The display screen 194 is configured to display an image, a video, or the like. The display screen 194 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the mobile phone 100 may include one or N display screens 194, where N is a positive integer greater than 1. In this embodiment of this application, a video may be displayed based on the video data obtained from the television 200.

The mobile phone 100 may implement a photographing function by using the ISP, the camera 193, the video codec, the GPU, the display screen 194, the application processor, and the like.

The external storage interface 120 may be used to connect to an external storage card, for example, a micro SD card, to extend a storage capability of the mobile phone 100. The external storage card communicates with the processor 110 through the external storage interface 120, to implement a data storage function. For example, files such as music and a video are stored in the external storage card.

The internal storage 121 may be configured to store computer-executable program code. The executable program code includes an instruction. The internal storage 121 may include a program storage area and a data storage area. The program storage area may store an operating system, an application required for at least one function (for example, a sound play function or an image play function), and the like. The data storage area may store data (for example, audio data and an address book) and the like that are created during use of the mobile phone 100. In addition, the internal storage 121 may include a high-speed random access memory, and may further include a non-volatile memory, for example, at least one magnetic disk storage device, a flash storage device, or a universal flash storage (UFS). The processor 110 runs the instruction stored in the internal storage 121 and/or an instruction stored in the memory disposed in the processor, to implement various function applications and data processing of the mobile phone 100.

The SIM card interface 195 is used to connect a SIM card. The SIM card may be inserted into the SIM card interface 195 or removed from the SIM card interface 195, to implement contact with or separation from the mobile phone 100. The mobile phone 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 is compatible with different types of SIM cards. The SIM card interface 195 is also compatible with an external storage card.

In some embodiments, the mobile phone 100 further includes the eSIM card 196, that is, an embedded SIM card. The eSIM card 196 may be embedded into the mobile phone 100, and cannot be separated from the mobile phone 100. The eSIM card 196 may be integrated into an SoC (system on chip), a modem chip, or a near field communication (NFC) chip of the mobile phone. This is not limited in this embodiment of this application.

A software system on the mobile phone 100 may use a layered architecture, an event-driven architecture, a microkernel architecture, a micro service architecture, or a cloud architecture. In this embodiment of the present invention, an Android system with a layered architecture is used as an example to describe a software structure of the mobile phone 100.

Figure 13:
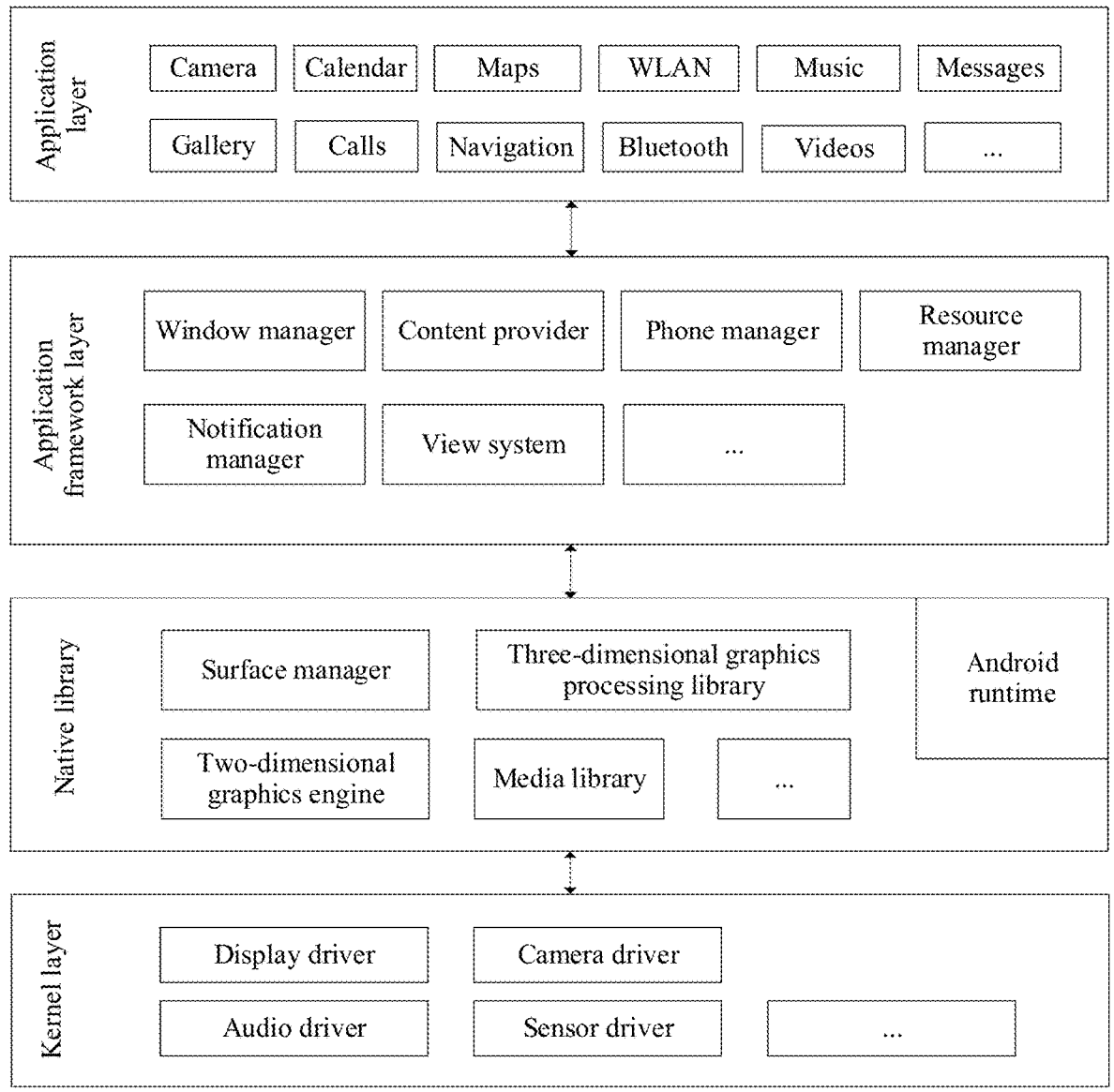
FIG. 13 is a block diagram of a software structure of a mobile phone 100 or a television 200 according to an embodiment of this application.

FIG. 13 is a block diagram of a software structure of a mobile phone 100 or a television 200 according to an embodiment of this application.

In the layered architecture, software is divided into several layers, and each layer has a clear-cut role and task. The layers communicate with each other through a software interface. In some embodiments, the Android system is divided into four layers: an application layer, an application framework layer, Android runtime and a native library (or referred to as a hardware abstraction layer), and a kernel layer from top to bottom.

The application layer may include a series of application packages. As shown in FIG. 11, an application package may include applications such as Shopping, News, Camera, Gallery, Calendar, Calls, Maps, Navigation, WLAN, Bluetooth, Music, Videos, and Messages. The application framework layer provides an application programming interface (API) and a programming framework to an application at the application layer. The application framework layer includes some predefined functions.

As shown in FIG. 13, the application framework layer may include a window manager, a page provider, a view system, a phone manager, a resource manager, a notification manager, and the like.

The view system includes a visual control, for example, a control for displaying text and a control for displaying an image. The view system may be used to construct an application. A display interface may include one or more views. For example, a display interface including a notification icon of Messages may include a text display view and a picture display view. In this embodiment of this application, the television 200 displays prompt information "The camera is not used" in a prompt box 508.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application run on the background, or may be a notification that appears on the screen in a form of a dialog window. For example, text information is prompted in the status bar, a prompt tone is played, the electronic device vibrates, or the indicator light blinks.

Android runtime includes a core library and a virtual machine. Android runtime is responsible for scheduling and management of the Android system.

The core library includes two parts. One of the parts is a performance function that needs to be invoked in the Java language, and the other part is a core library of Android.

The application layer and the application framework layer run on the virtual machine. The virtual machine executes Java files at the application layer and the application framework layer as binary files. The virtual machine is configured to implement functions such as object life cycle management, stack management, thread management, safety and exception management, and garbage collection.

The native library may include a plurality of functional modules, for example, a virtual camera module, a surface manager, a media library, a three-dimensional graphics processing library (for example, OpenGL ES), and a 2D graphics engine (for example, SGL) The virtual camera module includes a status management module, an image processing module, and an operation control module. The status management module is configured to control a usage status of the tablet computer 300. The status management module is configured to: when the television 200 determines that a user enables the photographing function of the application 204 supporting video calling the television 200 to have a capability of using the camera. The operation control module is configured to: open a video data obtaining channel, configure a format for video or image data, and process an instruction for requesting or disabling to obtain the video or image data at the framework layer. The image processing module is configured to perform processing, for example, decoding, color space conversion, scaling, rotation, mirroring, and filling on the video data based on the preset camera parameter.

The kernel layer is a layer between hardware and software. The kernel layer includes at least a display driver, a camera driver, an audio driver, and a sensor driver.

In some cases, the disclosed embodiments may be implemented by hardware, firmware, software, or any combination thereof. The disclosed embodiments may alternatively be implemented as an instruction that is carried or stored on one or more transient or non-transient machine-readable (for example, computer-readable) storage media and that may be read and executed by one or more processors. For example, the instruction may be distributed through a network or by another computer-readable medium. Therefore, the machine-readable medium may include any mechanism, for storing or transmitting information in a machine-readable (for example, computer-readable) form, that includes, but is not limited to, a floppy disk, a compact disc, an optical disc, a compact disc read-only memory (CD-ROM), a magnetic optical disc, a read-only memory (ROM), a random access memory (RAM), an erasable programmable read-only memory (EPROM), an electrically erasable programmable read-only memory (EEPROM), a magnetic card, an optical card, a flash memory, or a tangible machine-readable memory configured to transmit information (for example, a carrier, an infrared signal, or a digital signal) by electricity, light, sound, or by using a propagation signal in another form over the Internet. Therefore, the machine-readable medium includes any type of machine-readable medium suitable for storing or transmitting an electronic instruction or information in a machine-readable (for example, computer-readable) form.

Although this application has been illustrated and described with reference to some preferred embodiments of this application, a person of ordinary skill in the art should understand that various changes may be made to this application in form and detail without departing from the spirit and scope of this application.

What is claimed is:

1. A data transmission method, comprising:
   establishing a wireless communication connection between a first electronic device and a second electronic device;
   invoking a first function by a first application on the first electronic device;
   determining, by the first electronic device, to implement the first function by using the second electronic device;
   implementing, by the first electronic device, data transmission with the second electronic device by using a first function transceiver module of the first electronic device; and
   processing, by using a first function processing module of the first electronic device, data generated during implementation of the first function, wherein
   the first function transceiver module and the first function processing module are disposed at a hardware abstraction layer of the first electronic device;
   invoking a second function by the first application on the first electronic device;
   determining, by the first electronic device, to implement the second function by using a third electronic device;
   implementing, by the first electronic device, data transmission with the third electronic device by using a third function transceiver module; and
   processing, by using a third function processing module of the first electronic device, data generated during implementation of the second function, wherein the third function transceiver module and the third function processing module are independent of the first application.

2. The method according to claim 1, wherein the implementing, by the first electronic device, data transmission with the second electronic device by using a first function transceiver module of the first electronic device comprises:
   receiving, by the first function transceiver module of the first electronic device from the second electronic device, image data and/or video data captured by the second electronic device, and sending the received image data and/or video data to the first function processing module, wherein the first function is a photographing function.

3. The method according to claim 1, wherein the implementing, by the first electronic device, data transmission with the second electronic device by using a first function transceiver module of the first electronic device comprises:
   receiving, by the first function transceiver module of the first electronic device from the second electronic device, audio data acquired by the second electronic device, and sending the received audio data to the first function processing module, wherein the first function is an audio acquisition function.

4. The method according to claim 1, wherein the implementing, by the first electronic device, data transmission with the second electronic device by using a first function transceiver module of the first electronic device comprises:
   processing, by the first function processing module of the first electronic device, audio data that needs to be converted into sound by the second electronic device, and sending the processed audio data to the second electronic device by using the first function transceiver module, wherein the first function is a loudspeaking function.

5. The method according to claim 1, further comprising:
   invoking the first function by a second application on the first electronic device; and
   determining, by the first electronic device, to implement the first function by using a first functional component of the first electronic device.

6. The method according to claim 5, further comprising:
   transmitting, by the first electronic device to the second application by using a second function transceiver module of the first electronic device, data generated when the first functional component implements the first function; and
   processing, by using a second function processing module of the first electronic device, the data generated when the first functional component implements the first function.

7. The method according to claim 1, wherein the first function is a photographing function, and the second function is an audio acquisition function.

8. The method according to claim 1, further comprising:
   invoking a third function by the first application on the first electronic device;
   determining, by the first electronic device, to implement the third function by using a fourth electronic device;
   implementing, by the first electronic device, data transmission with the fourth electronic device by using a fourth function transceiver module; and
   processing, by using a fourth function processing module of the first electronic device, data generated during implementation of the third function, wherein the fourth function transceiver module and the fourth function processing module are independent of the first application.

9. The method according to claim 8, wherein the first function is a photographing function, the second function is an audio acquisition function, and the third function is an audio play function.

10. The method according to claim 1, wherein the first application comprises any one of an instant messaging application, a video conference application, a live streaming application, or a music application.

11. A first electronic device, comprising:
    at least one processor and a memory;
    the memory stores instructions that can be executed by the at least one processor, and the at least one processor executes the instructions stored in the memory enable the first electronic device to perform operations:
    establishing a wireless communication connection between the first electronic device and a second electronic device;
    invoking a first function by a first application on the first electronic device;
    determining to implement the first function by using the second electronic device;
    implementing data transmission with the second electronic device by using a first function transceiver module of the first electronic device; and
    processing, by using a first function processing module of the first electronic device, data generated during implementation of the first function, wherein
    the first function transceiver module and the first function processing module are disposed at a hardware abstraction layer of the first electronic device;

invoking a second function by the first application on the first electronic device;

determining to implement the second function by using a third electronic device;

implementing data transmission with the third electronic device by using a third function transceiver module; and processing, by using a third function processing module of the first electronic device, data generated during implementation of the second function, wherein the third function transceiver module and the third function processing module are independent of the first application.

12. The first electronic device according to claim 11, wherein the first function is a photographing function, and the implementing data transmission with the second electronic device by using a first function transceiver module of the first electronic device comprises:

receiving, by the first function transceiver module of the first electronic device from the second electronic device, image data and/or video data captured by the second electronic device, and sending the received image data and/or video data to the first function processing module.

13. The first electronic device according to claim 11, wherein the first function is an audio acquisition function; and the implementing data transmission with the second electronic device by using a first function transceiver module of the first electronic device comprises:

receiving, by the first function transceiver module of the first electronic device from the second electronic device, audio data acquired by the second electronic device, and sending the received audio to the first function processing module.

14. The first electronic device according to claim 11, wherein the first function is a loudspeaking function; and the implementing data transmission with the second electronic device by using a first function transceiver module of the first electronic device comprises:

processing, by the first function processing module of the first electronic device, audio data that needs to be converted into sound by the second electronic device, and sending the processed audio data to the second electronic device by using the first function transceiver module.

15. The first electronic device according to claim 11, wherein the operations further comprises:

invoking the first function by a second application on the first electronic device; and determining to implement the first function by using a first functional component of the first electronic device.

16. The first electronic device according to claim 15, wherein the operations further comprises:

transmitting to the second application by using a second function transceiver module of the first electronic device, data generated when the first functional component implements the first function; and processing, by using a second function processing module of the first electronic device, the data generated when the first functional component implements the first function.

17. The first electronic device according to claim 11, wherein the first function is a photographing function, and the second function is an audio acquisition function.

18. The first electronic device according to claim 11, wherein the operations further comprises:

invoking a third function by the first application on the first electronic device;

determining to implement the third function by using a fourth electronic device;

implementing data transmission with the fourth electronic device by using a fourth function transceiver module; and processing, by using a fourth function processing module of the first electronic device, data generated during implementation of the third function, wherein the fourth function transceiver module and the fourth function processing module are independent of the first application.

19. The first electronic device according to claim 18, wherein the first function is a photographing function, the second function is an audio acquisition function, and the third function is an audio play function.

20. The first electronic device according to claim 11, wherein the first application comprises any one of an instant messaging application, a video conference application, a live streaming application, and a music application.

* * * * *